United States Patent [19]

Dehnert et al.

[11] 3,907,769

[45] Sept. 23, 1975

[54] AZO COMPOUNDS CONTAINING A 2,6-DIAMINOPYRIDINE COUPLER COMPONENT

[75] Inventors: Johannes Dehnert; Gunther Lamm, both of Ludwigshafen, Germany

[73] Assignee: Badische Anilin- & Soda-Fabrik Aktiengesellschaft, Ludwigshafen (Rhine), Germany

[22] Filed: Mar. 28, 1973

[21] Appl. No.: 345,507

[30] Foreign Application Priority Data

Apr. 16, 1972 Germany............................ 2216570
Feb. 22, 1973 Germany............................ 2308663

[52] U.S. Cl. ............... 260/156; 260/154; 260/205;
260/206; 260/196; 260/207; 260/207.1;
260/246 B; 260/247.56; 260/293.63;
260/293.69; 260/294.9; 260/295 L;
260/295.5 A; 260/295.5 B; 260/295.5 T;
260/296 R

[51] Int. Cl.²... C09B 29/36; C09B 31/14; D06P 1/38; D06P 1/39

[58] Field of Search............................ 260/154, 156

[56] References Cited

UNITED STATES PATENTS

| | | | |
|---|---|---|---|
| 2,068,353 | 1/1937 | Schneiderwrith.................. | 260/156 |
| 2,145,579 | 1/1939 | Binz et al............................ | 260/156 |
| 2,148,705 | 2/1939 | Mietzsch et al.................... | 260/156 |
| 2,681,906 | 6/1954 | Granatek............................ | 260/156 |
| 3,531,457 | 9/1970 | Ackermann et al. .............. | 260/154 |
| 3,531,458 | 9/1970 | Ackermann et al. .............. | 260/154 |

FOREIGN PATENTS OR APPLICATIONS 270,987 12/1950 Switzerland........................ 260/156

Primary Examiner—Floyd D. Higel
Assistant Examiner—C. F. Warren
Attorney, Agent, or Firm—Johnston, Keil, Thompson & Shurtleff

[57] ABSTRACT

Azo acid dyes which contain one, two or three water-solubilizing sulfo groups and which, in the form of the free acids, correspond to the formula (I):

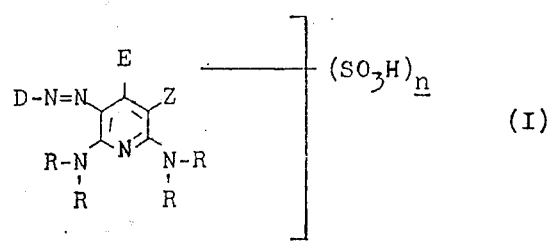

in which
D is the radical of a diazo component;
E is hydrogen, unsubstituted or substituted alkyl or phenyl;
Z is cyano or carbamoyl;
R is hydrogen or an unsubstituted or substituted aliphatic, araliphatic, cycloaliphatic or aromatic radical or two radicals R together with the nitrogen atom form a saturated heterocyclic ring; and $n$ is 1, 2 or 3. The dyes are eminently suitable for dyeing natural and synthetic polyamides and give bright yellow to violet colorations having excellent fastness properties.

8 Claims, No Drawings

AZO COMPOUNDS CONTAINING A 2,6-DIAMINOPYRIDINE COUPLER COMPONENT

The invention relates to dyes which in the form of the free acids correspond to the formula (I):

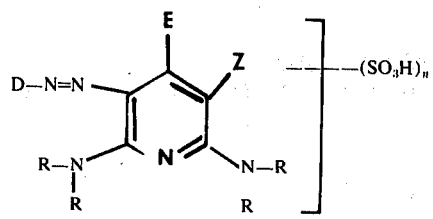

in which
- D is the radical of a diazo component;
- E is hydrogen, unsubstituted or substituted allyl or phenyl;
- Z is cyano or carbamoyl;
- R is hydrogen or an unsubstituted or substituted aliphatic, araliphatic, cycloaliphatic or aromatic radical or two radicals R together with the nitrogen atom form a saturated hetercyclic ring; and
- n is 1, 2 or 3.

Heterocyclic rings for the radical

may be for example pyrrolidine, piperidine, morpholine, piperazine or N-methyl-piperazine The invention relates particularly to dyes of the formula (Ia):

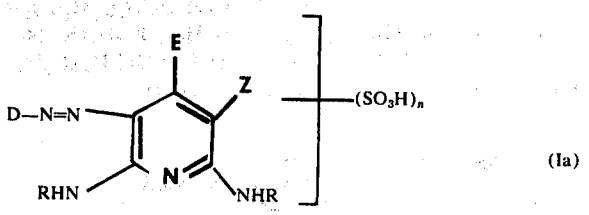

in which D, E, R, n and Z have the meanings given above.

Examples of radicals E (in addition to hydrogen) are ethyl, n-propyl, isopropyl, n-butyl, isobtuyl, pentyl, α-ethylpentyl, phenyl or methylphenyl, and preferably methyl.

The radicals R may be identical or different. They may be for example (in addition to hydrogen): alkyl of one to eight carbon atoms which may be interrupted by oxygen atoms and may bear hydroxy, acyloxy, alkoxy, cyano, cycloalkoxy, aralkoxy or aroxy as substituents, cycloalkyl or polycycloalkyl of five to fifteen carbon atoms which may bear hydroxy, chloro, hydroxyalkyl, chloroalkyl or alkyl as substituents, aralkyl of seven to 15 carbon atoms, or phenyl which may bear hydroxysulfonyl, chloro, hydroxy, alkoxy, alkyl, hydroxyalkyl or hydroxyalkoxy as substituents, or alkenyl, pyrrolidonyalkyl or carboxyalkyl.

The radical D of the diazo component may be derived particularly from aniline, aminophthalimide and aminoazobenzene derivatives which may for example bear hydroxysulfonyl, halogen, alkyl, alkoxy, acylamino, cyano, alkylsulfonyl, phenylsulfonyl, nitro, carboxyl, carbalkoxy, carbamoyl, N-substituted carbamoyl, sulfamoyl, N-substituted sulfamoyl or benzothiazolyl as substituents.

Examples of individual substituents in addition to those already specified are: chloro, bromo, methyl, ethyl trifluoromethyl, methoxy, ethoxy, methylsulfonyl, ethylsulfonyl, carbomethoxy, carboethoxy, carbo-β-ethoxyethoxy, carbo-β-methoxyethoxy, carbobutoxy, carbo-β-butoxyethoxy, N-methylcarbamoyl, N-ethylcarbamoyl, N-propylcarbamoyl, N-butylcarbamoyl, N-hexylcarbamoyl, N-β-ethylhexylcarbamoyl, N-β-hydroxyethylcarbamoyl, N-β-methoxyethylcarbamoyl, N-γ-methoxypropylcarbamoyl, N,N-dimethylcarbamoyl, N,N-diethylcarbamoyl, N-methyl-N-β-hydroxyethylcarbamoyl, N-phenylcarbamoyl, carboxypiperidide, carboxymorpholide, or carboxypyrrolidide and the corresponding sulfamoyl substituents, acetylamino, propionylamino, butyrylamino, methylsulfonylamino, phenylsulfonylamino, hydroxyacetylamino, benzoylamino, p-chlorobenzoylamino, phenacetylamino and the radicals of the formulae

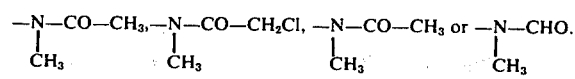

Examples of individual radicals R apart from those already mentioned are:
1. unsubstituted or substituted alkyl:

$CH_3$, $C_2H_5$, n-$C_3H_7$, i-$C_3H_7$, n-$C_4H_9$, i-$C_4H_9$, $C_6H_{13}$,

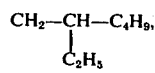

$CH_2CH_2OH$, $(CH_2)_3OH$,

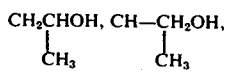

$(CH_2)_4OH$, $(CH_2)_6OH$,

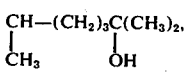

$(CH_2)_2O(CH_2)_2OH$, $(CH_2)_3O(CH_2)_4OH$ $(CH_2)_3OC_2H_4OH$, $(CH_2)_3OC_2H_4OCH_3$, $(CH_2)_3OC_2H_4OC_2H_5$, $(CH_2)_3O(CH_2)_6OH$, $(CH)_3OC_2H_4OCH(CH_3)_2$, $(CH_2)_3OC_2H_4OC_4H_9$, $(CH_2)_3OC_2H_4OCH_2C_6H_5$, $(CH_2)_3OC_2H_4OC_2H_4C_6H_5$,

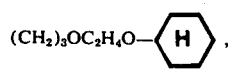

$(CH_2)_3OC_2H_4OC_6H_5$,

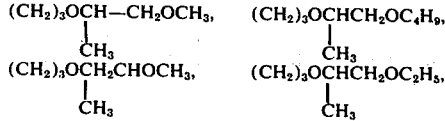

the corresponding radicals in which the grouping -$OC_2H_4$-, $$-OCH_2-\underset{CH_3}{CH}- \quad \text{or} \quad -O\underset{CH_3}{CH}-CH_2-$$

is present twice, thrice or four times. $CH_2CH_2OCH_3$, $CH_2CH_2OC_2H_5$, $CH_2CH_2OC_3H_7$, $CH_2CH_2OC_4H_9$, $CH_2CH_2OC_6H_5$, $(CH_2)_3OCH_3$, $(CH_2)_3OC_2H_5$, $(CH_2)_3OC_3H_7$, $(CH_2)_3OC_4H_9$, $(CH_2)_3OCH_2\underset{C_2H_5}{CH}C_4H_9$, $(CH_2)_3OC_6H_{13}$, $(CH_2)_3OC_8H_{17}$, $(CH_2)_3O-\!\!\bigcirc\!\!-H$, $(CH_2)_3OCH_2C_6H_5$, $(CH_2)_3OC_2H_4C_6H_5$, $(CH_2)_3OC_6H_5$, $-\underset{CH_3}{CHCH_2OCH_3}$, $\underset{CH_3}{CHCH_2OC_4H_9}$, $\underset{CH_3}{CHCH_2OC_6H_5}$, $\underset{CH_3}{CHCH_2OCH_2C_6H_5}$, $\underset{H_3C}{CH_2CHOCH_3}$, $\underset{CH_3}{CH_2CH-OC_2H_5}$, $\underset{CH_3}{CH_2CH-OC_4H_9}$, $\underset{CH_3}{CH_2CH-OC_2H_4C_6H_5}$, $\underset{CH_3}{CH_2CH-OC_6H_5}$, $CH_2-\!\!\bigcirc\!\!-H-CH_2OH$, $(CH_2)_2CN$, $(CH_2)_5CN$, $(CH_2)_6CN$ and $(CH_2)_7CN$.

2. unsubstituted or substituted cycloalkyl or polycycloalkyl:

[cycloalkyl structures]

and

[polycycloalkyl structure with OH]

3 aralkyl:
$CH_2C_6H_5$, $C_2H_4C_6H_5$, $\underset{CH_3}{CH_2CH-C_6H_5}$, $\underset{CH_3}{CH_2CH_2CHC_6H_5}$, $\underset{OH}{CH_2CH-C_6H_5}$, $\underset{CH_3}{CHCH_2CH_2C_6H_5OH}$, $\underset{CH_3}{CHCH_2CH_2}\!\!-\!\!\bigcirc\!\!-OH$, and $C_6H_4CH_3$ instead of $C_6H_5$.

4. unsubstituted or substituted phenyl:

$C_6H_5$, $C_6H_4CH_3$, $C_6H_3(CH_3)_2$, $C_6H_4OCH_3$, $C_6H_4OC_2H_5$, $C_6H_4OH$, $\underset{COCH_3}{C_6H_4NH}$, $C_6H_4OCH_2CH_2OH$ and $C_6H_4Cl$.

5. $CH_2CH=CH_2$, $(CH_2)_2COOH$, $(CH_2)_5COOH$ and $(CH_2)_m-N\!\!\bigcirc\!\!=O$ where $m$ is 2, 3, 4 or 6, $C_2H_4OCOCH_3$, $C_2H_4OCHO$, $C_2H_4OCOCH_2COCH_3$, $(C_2H_4O)_2COCH_3$, $(C_2H_4O)_2CHO$, $(CH_2)_3OCOCH_3$, $(CH_2)_3OCHO$ and $C_2H_4OCOC_2H_4\text{-}COOH$.

Examples of radicals R containing sulfo groups are:
$CH_2CH_2SO_3H$, $CH_2CH_2OSO_3H$, $(CH_2)_3OSO_3H$, $\underset{CH_3}{CH_2CHOSO_3H}$, $(CH_2)_4OSO_3H$, $(CH_2)_6OSO_3H$, $\underset{CH_3}{CH}-(CH_2)_3\underset{OSO_3H}{C(CH_3)_2}$, $(CH_2)_2O(CH_2)_2OSO_3H$, $(CH_2)_3O(CH_2)_2OSO_3H$, $(CH_2)_3O(CH_2)_4OSO_3H$, $(CH_2)_3OC_2H_4OCH_2C_6H_4SO_3H$, $(CH_2)_3OC_2H_4OC_2H_4C_6H_4SO_3H$, $(CH_2)_3OC_2H_4OC_6H_4SO_3H$, $CH_2CH_2OC_6H_4SO_3H$, $(CH_2)_3OC_6H_4SO_3H$, $(CH_2)_3OCH_2C_6H_4SO_3H$, $(CH_2)_3OC_2H_4C_6H_4SO_3H$, $\underset{CH_3}{CHCH_2OC_6H_4SO_3H}$, $CH_2-\!\!\bigcirc\!\!-H-CH_2OSO_3H$, $\bigcirc\!\!-H-O-C_2H_4OSO_3H$, [bicyclic]$-OSO_3H$,

[bicyclic]$-CH_2OSO_3H$, [bicyclic]$-C_2H_4OSO_3H$, $CH_2C_6H_4SO_3H$, $C_2H_4C_6H_4SO_3H$, $\underset{CH_3}{CH_2CHC_6H_4SO_3H}$, $\underset{CH_3}{CH_2CH_2CHC_6H_4SO_3H}$, $\underset{OH}{CH_2CHC_6H_4SO_3H}$, $C_6H_4SO_3H$,

[phenyl with CH_3 and SO_3H], [phenyl with CH_3, CH_3 and SO_3H],

[phenyl with CH_3 and SO_3H], [phenyl with OC_2H_5 and SO_3H],

[phenyl with OH and SO_3H], $C_6H_4OCH_2CH_2OSO_3H$,

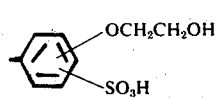 and 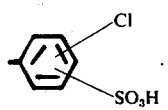

The following are examples of preferred substituents R: hydrogen, $CH_3$, $C_2H_5$, n-$C_3H_7$, iso-$C_3H_7$, n-$C_4H_9$, iso-$C_4H_9$, $C_6H_{13}$, $CH_2$-$CH_2$-OH, $(CH_2)_3OH$,

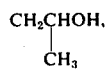

$(CH_2)_4OH$, $(CH_2)_6OH$,

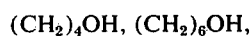

$(CH_2)_2O(CH_2)_2OH$, $(CH_2)_3O(CH_2)_2OH$, $(CH_2)_3O(CH_2)_4OH$, $(CH_2)_3O(CH_2)_6OH$,

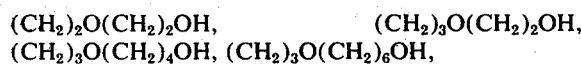

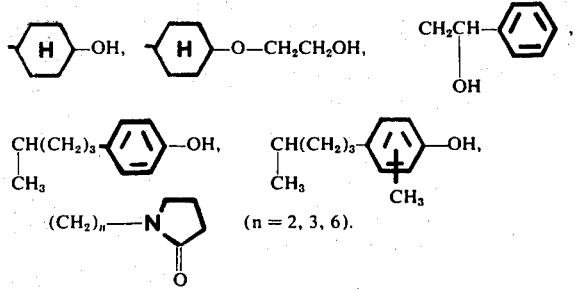

$CH_2CH_2OCH_3$, $CH_2CH_2OC_2H_5$, $CH_2CH_2OC_4H_9$, $(CH_2)_3OCH_3$, $(CH_2)_3OC_2H_5$, $(CH_2)_3OC_3H_7$, $(CH_2)_3OC_4H_9$, $(CH_2)_3OC_6H_{13}$, $(CH_2)_3OC_8H_{17}$,

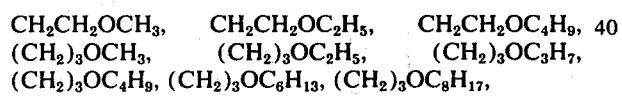

$(CH_2)_3OC_2H_4OCH_3$, $(CH_2)_3OC_2H_4OC_4H_9$, $(CH_2)_3OC_2H_4OC_6H_5$,

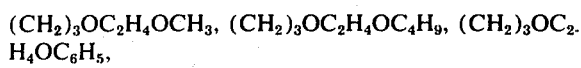

$CH_2C_6H_5$, $C_2H_4C_6H_5$,

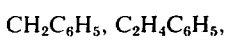

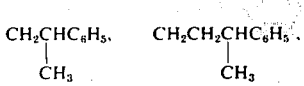

$C_6H_5$, $C_6H_4CH_3$, $C_6H_3(CH_3)_2$, $C_6H_4OCH_3$, $C_6H_4OC_2H_5$, $C_6H_4OC_2H_4OH$, $C_6H_4Cl$, $CH_2CH_2SO_3H$, $CH_2CH_2OSO_3H$, $(CH_2)_3OSO_3H$,

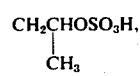

$(CH_2)_4OSO_3H$, $(CH_2)_6OSO_3H$, $(CH_2)_2O(CH_2)_2OSO_3H$, $(CH_2)_3O(CH_2)_2OSO_3H$, $(CH_2)_3O(CH_2)_4OSO_3H$, $(CH_2)_3O(CH_2)_6)OSO_3H$, $(CH_2)_3OC_6H_4SO_3H$, $(CH_2)_3OCH_2C_6H_4SO_3H$, $(CH_2)_3OC_2H_4C_6H_4SO_3H$, $CH_2C_6H_4SO_3H$, $C_2H_4C_6H_4SO_3H$,

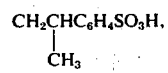

$C_6H_4SO_3H$,

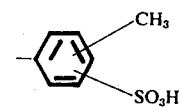

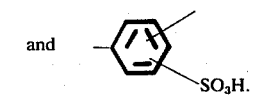

The dyes of the formula (I) may be prepared or used in the form of the free acids or conveniently as water-soluble salts, for example as alkali metal, ammonium or substituted ammonium salts. Examples of substituted ammonium cations in the salts are trimethylammonium, tris-β-hydroxyethylammonium, methoxyethylammonium, hexoxypropylammonium and dimethylphenylbenzylammonium.

To prepare a dye of formula (I) a diazo compound of an amine of formula (II):

$$D—NH_2$$

(II)

is reacted with a coupling component of formula (III):

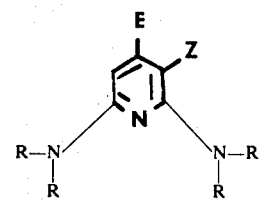

(III)

D and/or the compound of formula (III) usually containing at least one sulfo group. Diazotization and coupling are carried out by conventional methods. The new dyes, particularly those having sulfuric hemiester groups, may also be obtained by first preparing the compounds devoid of $SO_3H$-groups by diazotization and coupling and then converting these with sulfonation agents such as concentrated sulfuric acid, sulfuric acid monohydrate or oleum into the dyes of formula (I). Reference is made to the Examples regarding any details. Coupling components of the formula (III) and their production are disclosed in principle for example in U.S. Pat. Application Ser. No. 209,431 filed Dec. 17, 1971, now abandoned.

Examples of compounds of formula (II) are: aniline, 2-chloroaniline, 3-chloroaniline, 4-chloroaniline, 2-bromoaniline, 3-bromoaniline, 4-bromoaniline, 2-nitroaniline, 3-nitroaniline, 4-nitroaniline, 2-toluidine, 3-toluidine, 4-toluidine, 2-cyanoaniline, 3-cyanoaniline, 4-cyanoaniline, 2,4-dicyanoaniline, 3,4-dichloraniline, 2,5-dichloroaniline, 2,4,5-trichloroaniline, 2,4,6-trichloroaniline, 2-chloro-4-nitroaniline, 2-bromo-4-nitroaniline, 2-cyano-4-nitroaniline, 2-methylsulfonyl-4-nitroaniline, 4-chloro-2-nitroaniline, 4-methyl-2-nitroaniline, 2-methoxy-4-nitroaniline, 1-amino-2-trifluoromethyl-4-chlorobenzene, 2-chloro-5-aminobenzonitrile, 2-amino-5-chlorobenzonitrile, 1-amino-2-nitrobenzene-4-sulfonic acid n-butylamide or β-methoxyethylamide, 1-aminobenzene-4-methylsulfone, 1-aminobenzene-2,6-dibromobenzene-4-methylsulfone, 1-amino-2,6-dichlorobenzene-4-methylsulfone, 3,5-dichloroanthranilic acid methyl, propyl, β-methoxyethyl or butyl ester, 3,5-dibromoanthranilic acid methyl, ethyl, n-propyl, iso-propyl, n-butyl, isobutyl or β-methoxyethyl ester, N-acetyl-p-phenylenediamine, N-acetyl-m-phenylenediamine, N-benzenesulfonyl-p-phenylenediamine, 4-aminoacetophenone, 4-aminobenzophenone, 2-aminobenzophenone, 2-aminodiphenylsulfone, 4-aminodiphenylsulfone, the methyl, ethyl, propyl, butyl, isobutyl, β-methoxyethyl, β-ethoxyethyl, methyl diglycol, ethyl diglycol and methyl triglycol esters of 2-aminobenzoic acid, 3-aminobenzoic acid or 4-aminobenzoic acid, 3-aminophthalic acid, 4-aminophthalic acid, the dimethyl, diethyl, dipropyl or dibutyl ester of 5-aminoisophthalic or aminoterephthalic acid, 3-aminobenzoamide, 4-aminobenzoamide, methylamide, propylamide, butylamide, isobutylamide, cyclohexylamide, β-ethylhexylamide, γ-methoxypropylamide, 2-aminobenzoic, 3-aminobenzoic or 4-aminobenzoic dimethylamide, diethylamide, pyrrolidide, morpholide, 5-aminoisophthalamide, 3-aminophthalimide, 4-aminophthalimide, the imide, β-hydroxyethylimide, methylimide, ethylimide and tolylimide of 3-aminophthalic or 4-aminophthalic acid, the dimethylamide, diethylamide, pyrrolidide or morpholide of 4-aminobenzenesulfonic acid, 3-aminophthalohydrazide, 4-aminophthalohydrazide, the ethylimide, butylimide or methoxyethylimide of 4-aminophthalic acid, 1-aminoanthraquinone, 4-aminodiphenylene oxide, 2-aminobenzothiazole, 4-nitronaphthylamine, 5-nitronaphthylamine, 4-aminoazobenzene, 2',3-dimethyl-4-aminoazobenzene, 3',2-dimethyl-4-aminoazobenzene, 2,5-dimethyl-4-aminoazobenzene, 2-methyl-5-methoxy-4-aminoazobenzene, 2-methyl-4',5-dimethoxy-4-aminoazobenzene, 4'-chloro-2-methyl-5-methoxy-4-aminoazobenzene, 4'-nitro-2-methyl-5-methoxy-4-aminoazobenzene, 4'-chloro-2-methyl-4-aminoazobenzene, 2,5-dimethoxy-4-aminoazobenzene, 4'-chloro-2,5-dimethoxy-4-aminoazobenzene, 4'-nitro-2,5-dimethoxy-4-aminoazobenzene, 4'-chloro-2,5-dimethyl-4-aminoazobenzene, 4'-methoxy-2,5-dimethyl-4-aminoazobenzene, 4'-nitro-4-aminoazobenzene, 3,5-dibromo-4-aminoazobenzene, 2,3'-dichloro-4-aminoazobenzene, 3-methoxy-4-aminoazobenzene, 1-aminobenzene-2-sulfonic acid, 1-aminobenzene-3-sulfonic acid, 1-aminobenzene-4-sulfonic acid, 1-aminobenzene-2,4-disulfonic acid, 1-aminobenzene-2,5-disulfonic acid, 1-amino-2-methylbenzene-4-sulfonic acid, 1-amino-3-methylbenzene-4-sulfonic acid, 1-amino-4-methylbenzene-2-sulfonic acid, 1-amino-4-methylbenzene-3-sulfonic acid, 2-nitroaniline-4-sulfonic acid, 4nitroaniline-2-sulfonic acid, 2-chloroaniline-4-sulfonic acid, 2-chloroaniline-5-sulfonic acid, 3-chloroaniline-6-sulfonic acid, 4-chloroaniline-2-sulfonic acid, 1-amino-3,4-dichlorobenzene-6-sulfonic acid, 1-amino-2,5-dichlorobenzene-4-sulfonic acid, 1-amino-4-methyl-5-chlorobenzene-2-sulfonic acid, 1-amino-3-methyl-4-chlorobenzene-6-sulfonic acid, 2-amino-4-sulfobenzoic acid, 1-amino-4-acetaminobenzene-2-sulfonic acid, 1-amino-5-acetaminobenzene-2-sulfonic acid, 1-amino-2-methoxy-4-nitrobenzene-5-sulfonic acid, 1-aminoanthraquinone-2-sulfonic acid, 1-aminonaphthalene-2-sulfonic acid, 1-aminonaphthalene-4-sulfonic acid, 2-aminonaphthalene-1-sulfonic acid, and the diazo compounds of the following formulae:

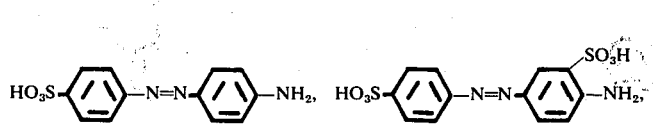
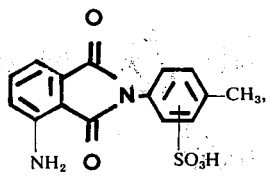
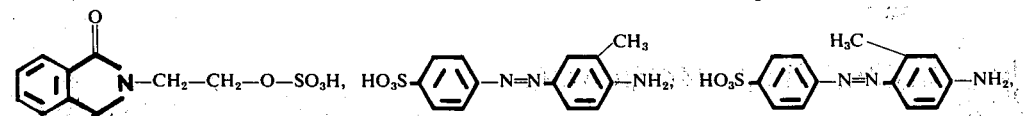
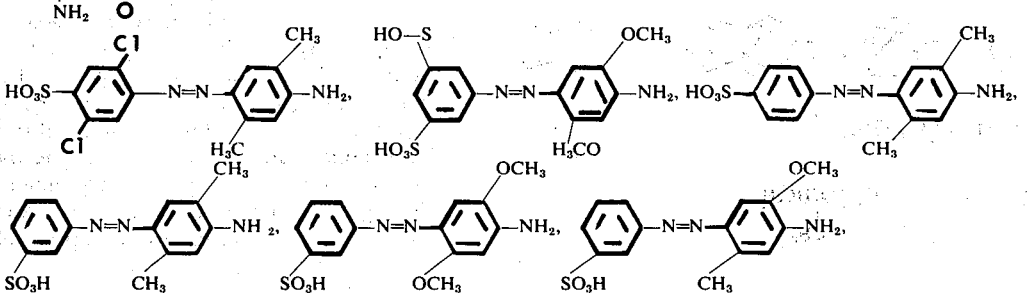

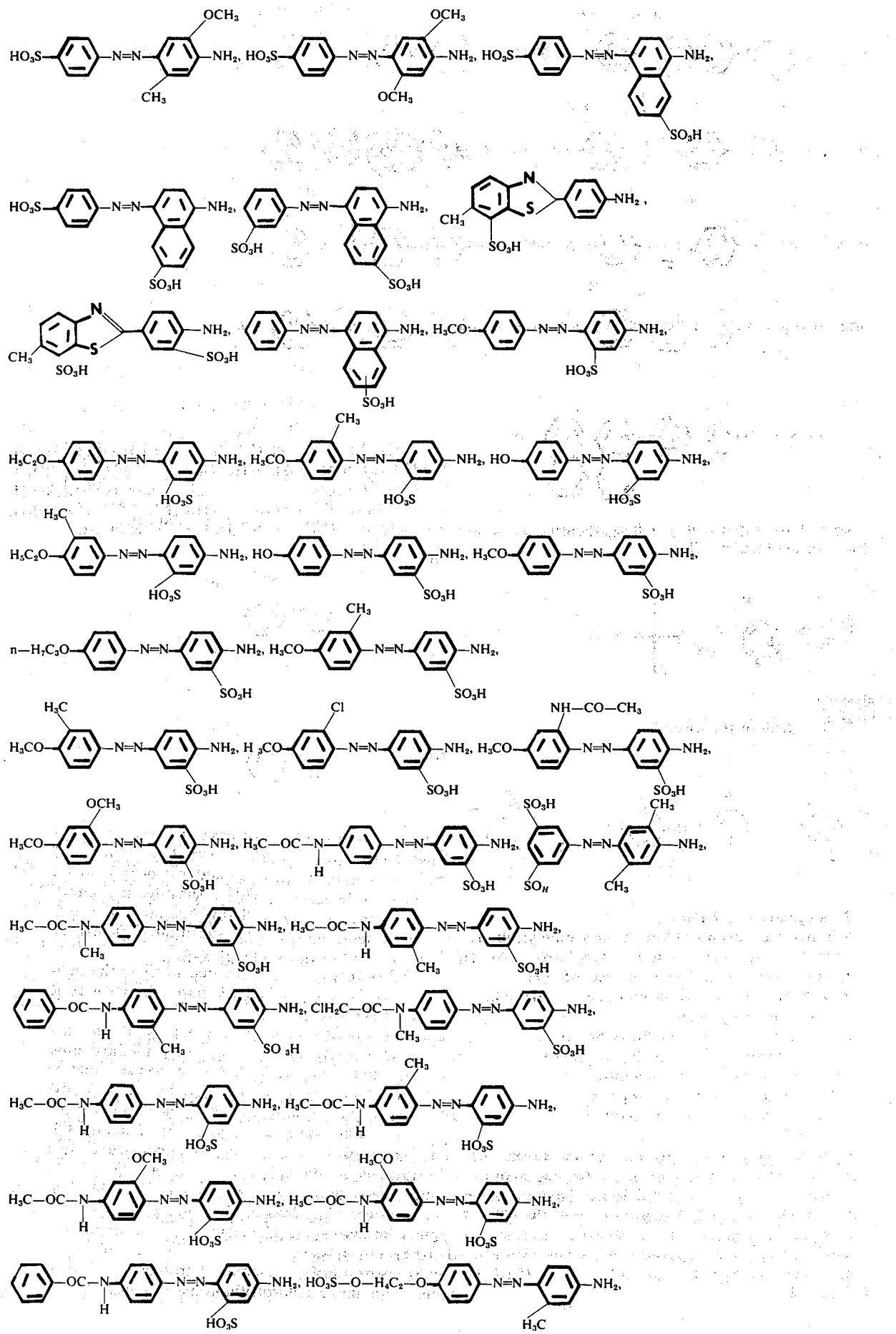

—Continued

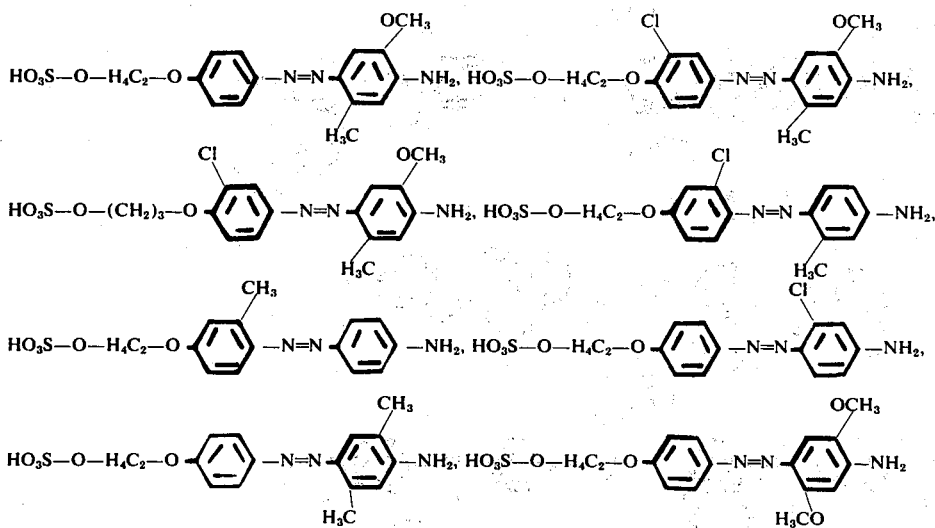

and

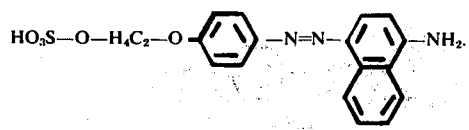

Dyes having particular industrial significance are those of the formula (Ib):

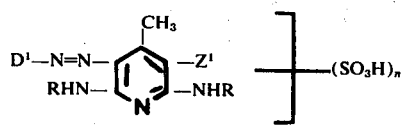 (Ib)

in which
D¹ is a radical of the formula:

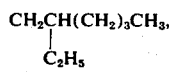 or 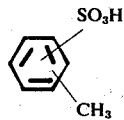

$Z^1$ is cyano or carbamoyl;
Y is hydrogen, cyano, chloro, bromo, methylsulfonyl, ethylsulfonyl, phenylsulfonyl, carbalkoxy or $SO_3H$;
$Y^1$ is hydrogen, chlorine, bromine or $SO_3H$;
$Y^2$ is hydrogen, chloro, bromo, methyl, carbalkoxy, 2-benzothiazolyl or $SO_3H$;
X is hydrogen, methyl, methoxy or $SO_3H$;
$X^1$ is hydrogen, methyl, methoxy or $SO_3H$;
$X^2$ is hydrogen, methyl or methoxy;
T is hydrogen or a substituent; and
R and n have the means given above.
$Z^1$ is preferably cyano.

Preferred radicals for T are alkyls of two to eight carbon atoms which may be interrupted by oxygen or may bear hydroxy, phenoxy or $OSO_3H$ as substituents, benzyl, benzyl bearings $SO_3H$ as a substituent, phenylethyl, phenylethyl bearing $SO_3H$ as a substituent, phenyl or phenyl bearing $SO_3H$ and/or other radicals as substituents. Examples of radicals T are $CH_3$, $C_2H_5$, $C_3H_7$, $C_4H_9$, $C_6H_{13}$, $CH_2CH(CH_2)_3CH_3$,
|
$C_2H_5$ $CH_2CH_2OH$, $(CH_2)_3OH$, $CH_2CH_2OCH_2CH_2OH$, $(CH_2)_3O(CH_2)_4OH$, $CH_2CH_2OC_6H_5$, $CH_2CH_2OSO_3H$, $(CH_2)_3OSO_3H$, $CH_2CH_2OCH_2CH_2OSO_3H$, $(CH_2)_3O(CH_2)_4OSO_3H$, $CH_2C_6H_5$, $CH_2C_6H_4SO_3H$, $C_2H_4C_6H_5$, $C_2H_4C_6H_4SO_3H$, $C_6H_5$, $C_6H_4SO_3H$,

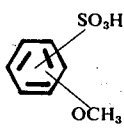

Preferred radicals R in the case of dyes of the formula (Ia) are alkyl of 1 to 8 carbon atoms which may be interrupted by oxygen atoms and may bear hydroxy, phenoxy, benzoyloxy or $OSO_3H$ as substituents, benzyl, phenlethyl, benzyl or phenylethyl bearing $SO_3H$ as a substituent, unsubstituted or substituted phenyl or hydroxysulfonylphenyl and hydrogen.

The $SO_3H$ groups may be situated solely in the radical D or solely in the radicals R, particularly where R contains a phenyl radical.

Examples of preferred diazo components are: the methyl, ethyl, n-propyl, isopropyl or β-methoxyethyl ester of 2-aminobenzoic acid, 3-aminobenzoic acid or 4-aminobenzoic acid, the methyl, ethyl or isopropyl ester of 2-amino-3,5-dichlorobenzoic acid, the methyl, ethyl or β-methoxyethyl ester of 2-amino-3,5-dibromobenzoic acid, 3-bromo-4-aminobenzoic acid ethyl ester, diethyl aminoterephthalate, 2-aminobenzonitrile, 2,4-dicyanoaniline, 2-amino-5-chlorobenzonitrile, 2-amino-5-bromobenzonitrile, 2-amino-3-bromo-5-chlorobenzonitrile, 2-amino-3,5-dibromobenzonitrile, 2-amino-3,5-dichlorobenzonitrile, 2-amino-1-trifluoromethylbenzene, 2-amino-5-chlorotrifluoromethylbenzene, 4- aminobenzene-1-methylsulfone, 3-chloro-4-aminobenzene-1-methylsulfone, 2-aminodiphenylsulfone, 4-aminodiphenylsulfone, the β-hydroxyethylimide of 3-aminophthalic acid or of 4-aminophthalic acid, the β-methoxyethylimide of 3-aminophthalic acid or 4-aminophthalic acid, the butylimide or tolylimide of 3-aminophthalic acid or 4-aminophthalic acid, 1-amino-4-nitrobenzene, 1-amino-4-acetylaminobenzene, 1-amino-3-acetylaminobenzene, 4-aminobenzamide, the N-methylamide, N-butylamide, N-β-ethylhexylamide or N,N-diethylamide of 4-aminobenzoic acid, the amide of 3-aminobenzenesulfonic acid or of 4-aminobenzenesulfonic acid, the N-butylamide or morpholide of 3-aminobenzenesulfonic acid or of 4-aminobezenesulfonic acid, 2-chloroaniline-4-sulfonic acid, 2-chloroaniline-5-sulfonic acid, 3-chloroaniline-6-sulfonic acid, 4-chloroaniline-2-sulfonic acid, 1-amino-3,4-dichlorobenzene-6-sulfonic acid, 1-amino-2,5-dichlorobenzene-4-sulfonic acid, 1-amino-2,5-dibromobenzene-4-sulfonic acid, 1-amino-4-methyl-5-chlorobenzene-2-sulfonic acid, 1-amino-3-methyl-4-chlorobenzene-6-sulfonic acid and the amines of the following formulae:

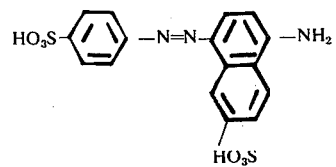

and

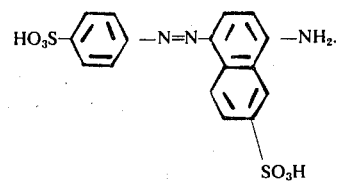

Examples of preferred coupling components are:

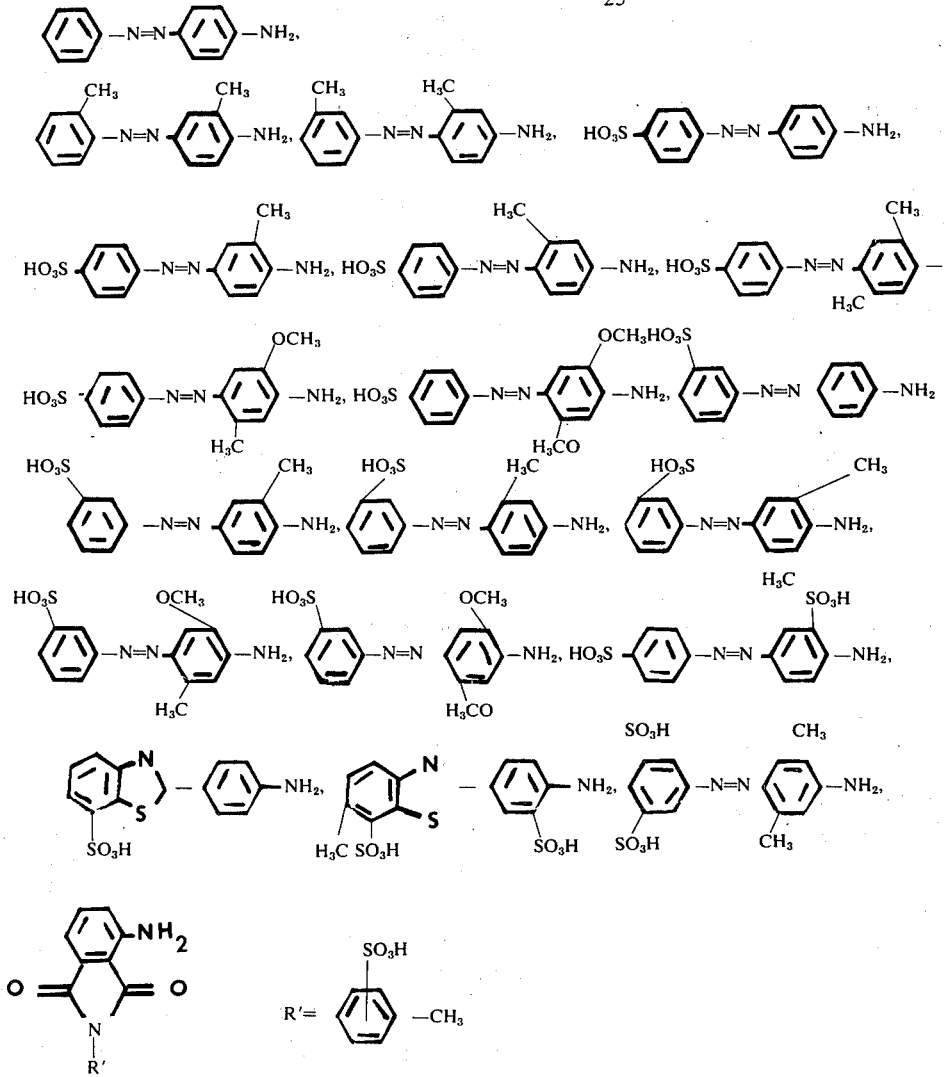

= —CH$_2$—CH$_2$—O—SO$_3$H

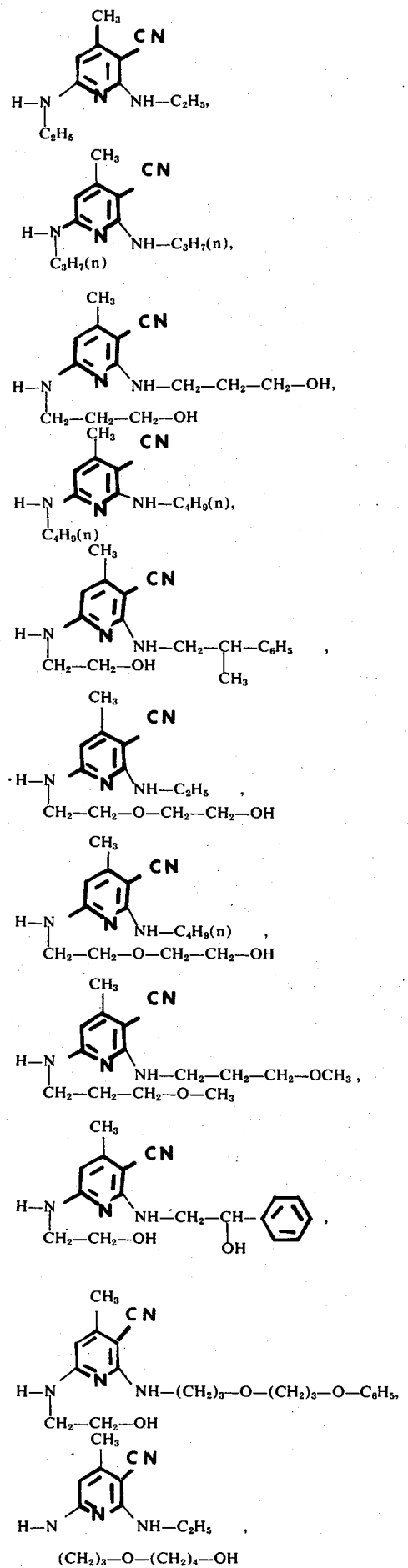
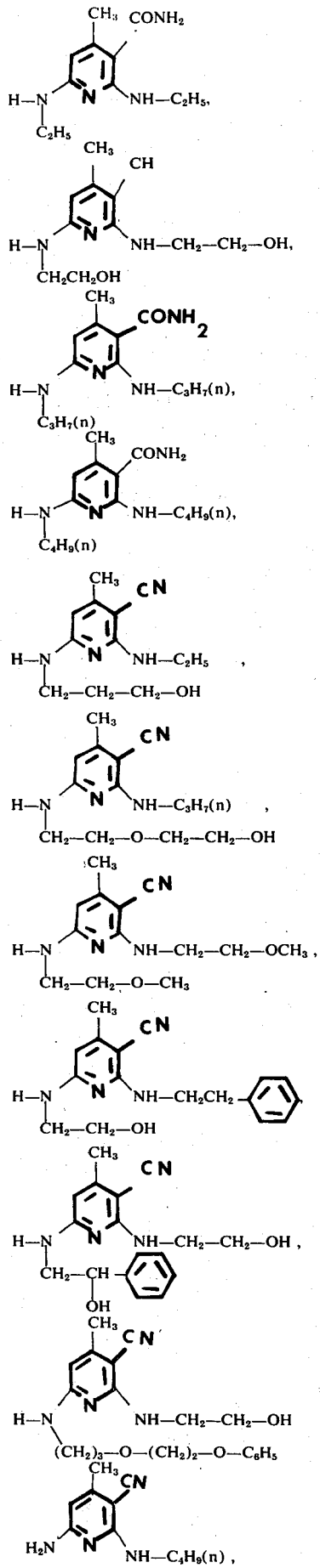

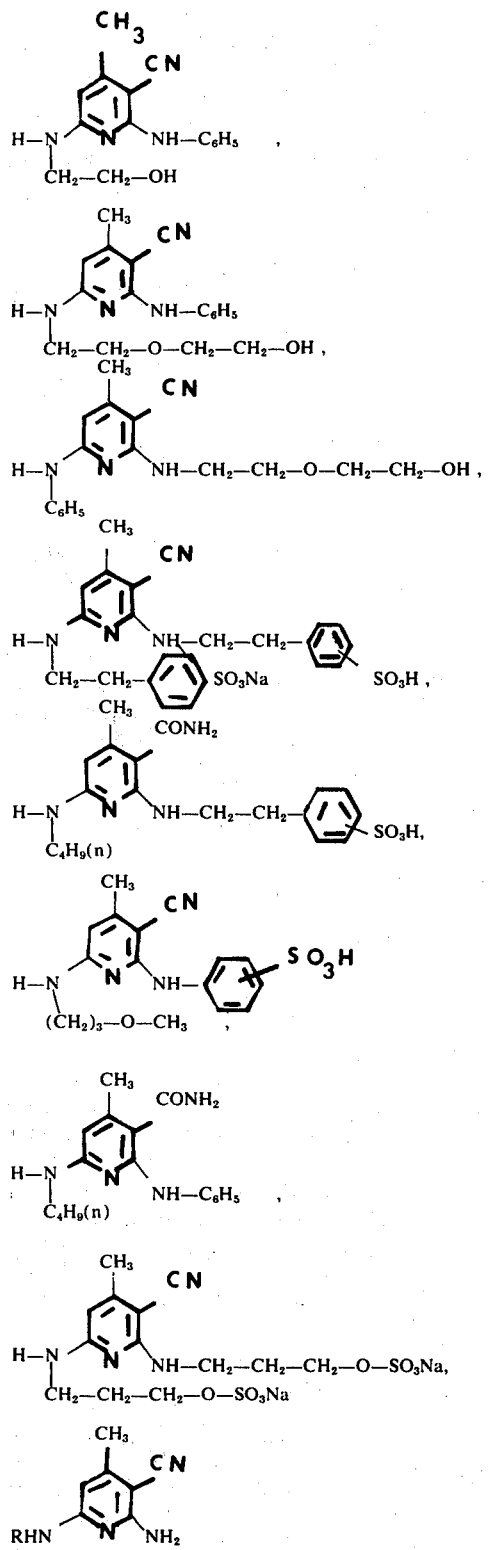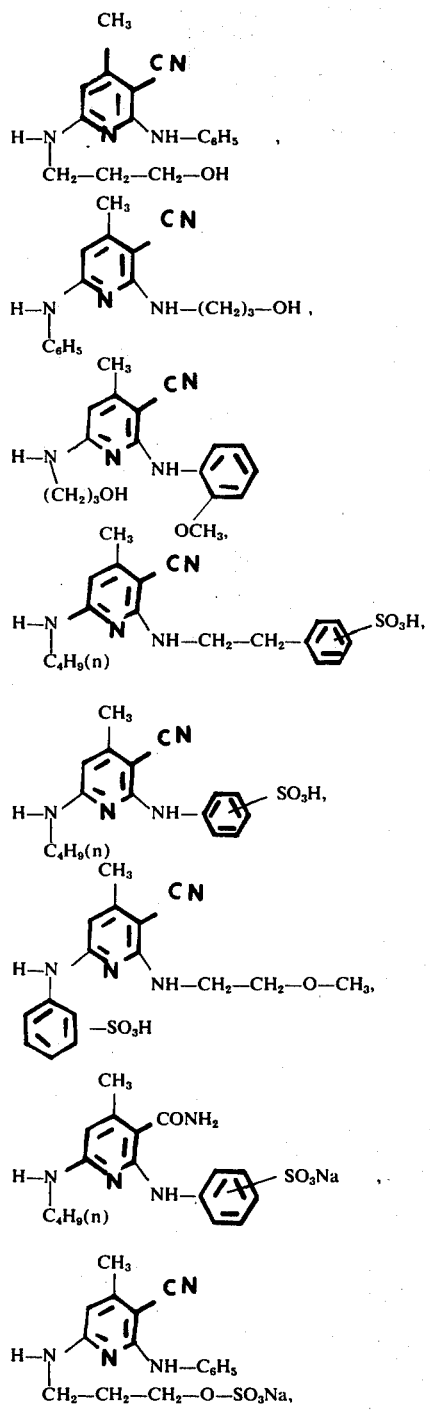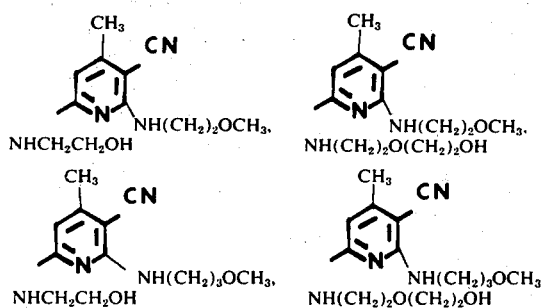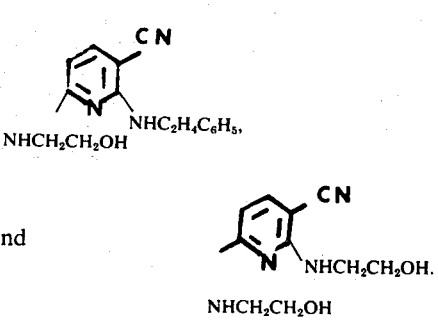

The new dyes are yellow to reddish blue and are suitable for dyeing natural and synthetic polyamides such as wool, silk, nylon 6 or nylon 6,6. Bright dyeings having excellent fastness properties, particularly light fastness, are obtained with the new dyes. The solubilities are also excellent in some cases.

The following Examples illustrate the invention; parts and percentages are by weight unless stated otherwise.

EXAMPLE 1

One hundred twenty-two parts of the 1:1 reaction product of aniline and 2,6-dichloro-3-cyano-4-methylpyridine (melting point: 135° to 140°C) is heated under reflux with 450 parts of n-butylamine for from 5 to 9 hours. The excess butylamine is then substantially distilled off, and the hot residue is stirred into about 1,500 parts of ice-water and acidified with hydrochloric acid to a pH of from about 1 to 3. The deposited precipitate is filtered off, washed with water and dried. 144 parts of a colorless product is obtained (melting point: 115°C) which is added in portions at room temperature to about 450 parts of 23% oleum. The sulfonation mixture is stirred for from three to four hours at 30° to 40°C and then about 1,500 parts of ice, 500 parts of saturated common salt solution and finally 400 parts of 50% caustic soda solution are added. After stirring overnight and cooling to about 5° to 10°C the precipitated product is filtered off, washed with common salt solution and dried. About 120 to 130 parts of a colorless powder is obtained which probably has the formula:

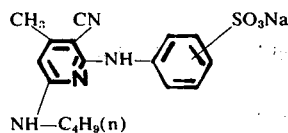

and which contains a minor portion of the byproduct having the probable formula:

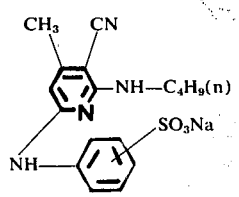

Six parts of methyl anthranilate is dissolved in about 60 parts of water and 12 parts of 30% hydrochloric acid. 60 parts of ice and 13 parts by volume of 23% sodium nitrite solution are added. The whole is stirred for about thirty to forty-five minutes at 0° to 5°C, any excess of nitrous acid present is destroyed as usual and the diazonium salt mixture is added to a solution or suspension, cooled to 0° to 5°C, of the abovementioned sulfonated coupling component in about 400 parts of water and 10 parts of 30% hydrochloric acid; the mixture is stirred for 30 minutes at 0° to 5°C and then sodium acetate solution is added until the pH of the coupling mixture is about 3. After coupling is completed about 50 parts of sodium chloride is added, the mixture is stirred for about two hours and the precipitated dye of the probable formula:

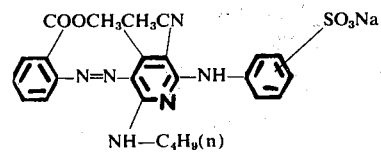

is filtered off and dried. About 20 parts of an orange powder is obtained which dissolves in water to give an orange color and dyes polycaprolactam cloth clear full yellow shades having very good fastness properties.

The color of the dyeing on wool is yellow.

EXAMPLE 2

14.3 parts of the diazo component of the formula:

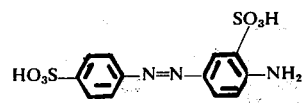

is dissolved in a mixture of 150 parts of hot water and 6.5 parts of 50% caustic soda solution, allowed to cool somewhat, 13 parts by volume of 23% sodium nitrite solution is added and the mixture is poured while stirring onto about 200 parts of ice and 25 parts of 30% hydrochloric acid. Diazotization is completed after stirring for about four hours at 0° to 5°C. Any excess of nitrous acid present is destroyed as usual and then a solution, cooled to 10°C, of 9.5 parts of the coupling component of the formula:

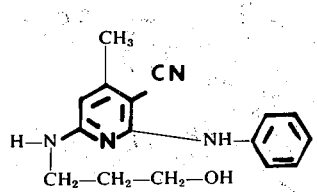

in a mixture of about 100 parts of formamide, 10 parts of 30% hydrochloric acid and 0.5 part of an emulsifying agent is added. The coupling mixture is neutralized to a pH of about 4 with 50% sodium acetate solution. After coupling is over the dye formed is precipitated by adding about 100 parts of potassium chloride and filtered off and dried.

About 20 parts of a dark powder of the formula:

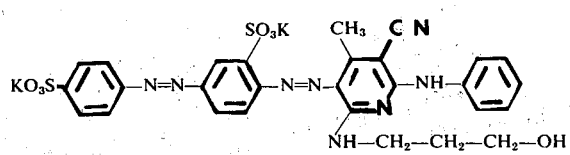

is obtained which dissolves in water with a reddish violet color and dyes polycaprolactam cloth bluish red shades having very good fastness properties.

Dyes characterized in the following Table by their diazo and coupling components can be prepared by the method described in Examples 1 and 2.

| No. | Diazo component | Coupling component | Shade of dyeing on polycaprolactam |
|---|---|---|---|
| 2 | $O_3S-\langle\bigcirc\rangle-N=N-\langle\bigcirc\rangle(SO_3H)-NH_2$ | 4-methyl-3-cyano-2-(NH-$R^1$)pyridine with NH-$R^2$ | |
| 3 | '' | $R^{1,2} = -C_2H_5$ | red |
| 4 | '' | $R^{1,2} = -C_3H_7(n)$ | bluish red |
| 5 | $HO_3S-\langle\bigcirc\rangle-N=N-\langle\bigcirc\rangle(SO_3H)-NH_2$ | $R^1 = -C_2H_5$<br>$R^2 = -C_3H_7(n)$ | red |
| 6 | '' | $R^1 = -CH_2-CH(CH_3)-C_6H_5$<br>$R^2 = -C_2H_4-OH$ | '' |
| 7 | '' | $R^1 = -C_2H_5$<br>$R^2 = -CH_2-CH_2-O-CH_2-CH_2-OH$ | '' |
| 8 | '' | $R^1 = -C_4H_9(n)$<br>$R^2 = -(CH_2)_2-O-(CH_2)_2-OH$ | bluish red |
| 9 | '' | $R^1 = -C_2H_5$<br>$R^2 = -(CH_2)_3-O-(CH_2)_4-OH$ | '' |
| 10 | '' | $R^1 = -\langle\bigcirc\rangle(NHCOCH_3)$<br>$R^2 = -CH_2-CH_2-OH$ | '' |
| 11 | '' | $R^1 = -\langle\bigcirc\rangle(CH_3)$<br>$R^2 = -CH_2-CH_2-CH_2-OH$ | '' |
| 12 | '' | $R^1 = -CH_2-CH_2-CH_2-O-CH_3$<br>$R^2 = -CH_2-CH_2-O-CH_2-CH_2-OH$ | red |
| 13 | '' | $R^1 = -CH_2-CH_2-O-COCH_3$<br>$R^2 = -CH_2-CH_2-CH_2-CH_3$ | '' |
| 14 | '' | $R^1 = -CH_2-CH_2-CH_2-O-CH_2-CH_2-O-\langle\bigcirc\rangle$<br>$R^2 = -CH_2-CH_2-OH$ | bluish red |
| 15 | $HO_3S-\langle\bigcirc\rangle-N=N-\langle\bigcirc\rangle(SO_3H)-NH_2$ | $R^1 = -\langle\bigcirc\rangle(OCH_3)$<br>$R^2 = -CH_2-CH_2-CH_2-OH$ | red |
| 16 | '' | $R^1 = -\langle\bigcirc\rangle(OCH_3)$<br>$R^2 = -CH_2-CH_2-CH_2-OH$ | bluish red |
| 17 | '' | $R^1 = -\langle\bigcirc\rangle(OCH_3)$<br>$R^2 = -CH_2-CH_2-CH_2-OH$ | red |
| 18 | '' | $R^1 = -\langle\bigcirc\rangle-OCH_3$<br>$R^2 = -CH_2-CH_2-CH_2-OH$ | '' |
| 19 | '' | $R^{1,2} = n-C_4H_9$ | '' |
| 20 | $HO_3S-\langle\bigcirc\rangle-N=N-\langle\bigcirc\rangle-NH_2$ | $R^1 = H$<br>$R^2 = H$ | orange |
| 21 | '' | $R^{1,2} = -CH_2-CH_2-O-CH_3$ | yellowish red |
| 22 | '' | $R^1 = C_2H_5$<br>$R^2 = -CH_2-CH_2-O-CH_3$ | '' |
| 23 | '' | $R^1 = -C_2H_5$<br>$R^2 = -CH_2-CH_2-O-CH_2-CH_2OH$ | '' |
| 24 | '' | $R^1 = -C_2H_5$<br>$R^2 = -CH_2-CH_2-CH_2-O-SO_3Na$ | red |
| 25 | $HO_3S-\langle\bigcirc\rangle-N=N-\langle\bigcirc\rangle(CH_3,CH_3)-NH_2$ | $R^{1,2} = -CH_2-CH_2-O-CH_3$ | yellowish red |
| 26 | '' | $R^{1,2} = -C_2H_5$ | '' |

| No. | Diazo component | Coupling component | Shade of dyeing on polycaprolactam |
|---|---|---|---|
| 27 | " | $R^1 = -C_2H_5$ <br> $R^2 = -CH_2-CH_2-O-CH_2-Ch_2-OH$ | " |
| 28 | " | $R^1 = -C_2H_5$ <br> $R^2 = -CH_2-CH_2-O-SO_3Na$ | " |
| 29 | (SO₃H, CH₃, CH₃ substituted phenyl-N=N-phenyl-NH₂) | $R^{1,2} = -CH_2-CH_2-O-CH_3$ | " |
| 30 | " | $R^{1,2} = -C_2H_5$ | " |
| 31 | " | $R^1 = -C_2H_5$ <br> $R^2 = -CH_2-CH_2-O-CH_2-CH_2-OH$ | " |
| 32 | HO₃S-phenyl-N=N-(OCH₃, OCH₃)phenyl-NH₂ | " | reddish violet |
| 33 | " | $R^{1,2} = -C_2H_5$ | Bordeaux |
| 34 | " | $R^{1,2} = -CH_2-CH_2OH$ | reddish violet |
| 35 | " | $R^{1,2} = -CH_2-CH_2-O-CH_3$ | " |
| 36 | " | $R^{1,2} = -(CH_2)_3-O-CH_3$ | " |
| 37 | (SO₃H, OCH₃, OCH₃ substituted) phenyl-N=N-phenyl-NH₂ | $R^{1,2} = -CH_2-CH_2-OH$ | reddish violet |
| 38 | " | $R^1 = -C_2H_5$ <br> $R^2 = -CH_2-CH_2-O-CH_2-CH_2-OH$ | " |
| 39 | " | $R^{1,2} = -C_2H_5$ | " |
| 40 | HO₃S-phenyl-N=N-naphthyl(SO₃H)-NH₂ | $R^{1,2} = -C_2H_5$ | Bordeaux |
| 41 | " | $R^{1,2} = -C_3H_7(n)$ | " |
| 42 | " | $R^1 = -C_2H_5$ <br> $R^2 = -CH_2-CH_2-O-Ch_2-CH_2-OH$ | " |
| 43 | " | $R^1 = -C_2H_5$ <br> $R^2 = -CH_2-CH_2-O-Ch_2-CH_2-OH$ | " |
| 44 | " | $R^1$ and $R^2 = -C_2H_5$ | " |

Example 45

Fifty parts of the dye of the formula:

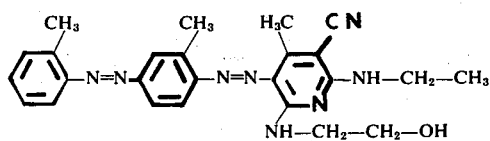

are added at room temperature with efficient stirring to about 120 parts of 100% sulfuric acid. The whole is stirred overnight at 20° to 30°C and the mixture is then poured onto a mixture of 500 parts of ice, 100 parts of 50% caustic soda solution and 50 parts of potassium chloride. After cooling to 0° to 10°C the precipitated dye is filtered off. It has the formula:

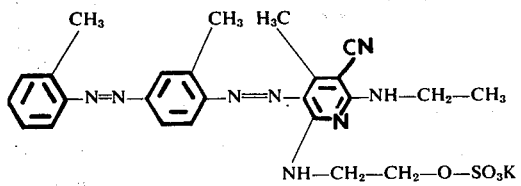

It is washed with dilute potassium chloride solution and dried. A reddish brown powder is obtained which dissolves in water with a yellowish red color and dyes polycaprolactam cloth in yellowish red shades having good fastness properties.

Coupling components having sulfonic ester groups and the dyes given in the following Table are obtained by the method described in Example 45.

| No. | Dye | Shade |
|---|---|---|
| 46 | phenyl-N=N-phenyl-N=N-(H₃C, CN pyridyl)(-NH-CH₂-CH₂-O-SO₃K)(NH-CH₂-CH₂-OSO₃K) | yellowish red |
| 47 | phenyl-N=N-phenyl-N=N-(H₃C, CN pyridyl)(-NH-CH₂-CH₂-O-CH₃)(NH-CH₂-CH₂-O-SO₃K) | " |

| No. | Dye | Shade |
|---|---|---|
| 48 | 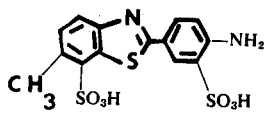 | yellow |
| 49 | | '' |
| 50 | | '' |
| 51 | | yellowish red |
| 52 | | reddish orange |

EXAMPLE 53

Twenty-four parts of the diazo component of the formula:

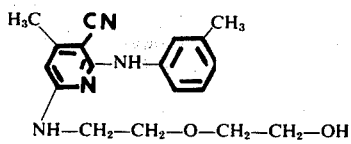

is dissolved in a mixture of 150 parts of water and about 6.5 parts of 50% caustic soda solution. Then 12.5 parts by volume of 23% sodium nitrite solution is added, the whole is allowed to cool and 150 parts of ice is added. The mixture thus cooled to about 0°C is acidified with 16 to 18 parts of 30% hydrochloric acid. Diazotization is over within about 2 hours. Excess nitrous acid is destroyed as usual and the diazonium salt mixture is allowed to flow within ten minutes into a solution or suspension cooled to 0°C of the coupling component of the formula:

in 10 parts of 30% hydrochloric acid, 250 parts of water, 0.5 part of an emulsifying agent and 150 parts of formamide. The coupling mixture is stirred for fifteen minutes at 0°C to 5°C and coupling is then ended by adding 30 to 50% sodium acetate solution until the pH of the mixture is about 3.5 to 4.5. 150 parts of sodium chloride is then added, the whole is stirred for about three hours and the precipitated dye of the formula:

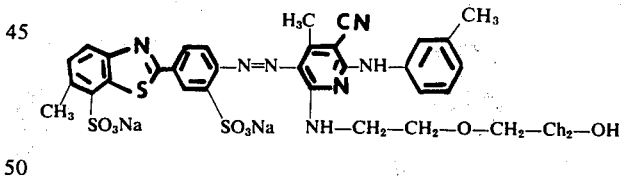

is filtered off, washed with little dilute sodium chloride solution and dried. About 26 parts of a red powder is obtained which dissolves in water with a red color and dyes polycaprolactam cloth yellowish red shades having excellent fastness properties.

The dyes characterized in the following Table by their diazo and coupling components are prepared by a method analogous to that of Example 1, 2 or 53:

| No. | Diazo component | Coupling component | Shade |
|---|---|---|---|
| | | | orange (bright) |

-Continued

| No. | Diazo component | Coupling component | Shade |
|---|---|---|---|
| 54 | '' | $R^{1,2} = -CH_2-CH_2-OH$<br>$-CH_2-CH_2-CH_2-OH$<br>$CH_3$ | |
| 55 | '' | $R^1 = -CH_2-CH-$⌬<br>$R^2 = -CH_2-CH_2-OH$ | '' |
| 56 | '' | $R^1 = -C_2H_5$<br>$R^2 = -CH_2-CH_2-O-CH_2-CH_2-OH$ | '' |
| 57 | '' | $R^1 = C_4H_9(n)$<br>$R^2 = -CH_2-CH_2-O-CH_2-CH_2-OH$ | '' |
| 58 | '' | $R^1 = -(CH_2)_3-O-CH_2-C_6H_5$<br>$R^2 = -CH_2-CH_2-OH$ | '' |
| 59 | '' | $R^1 = -$⌬$-NH-COCH_3$<br>$R^2 = -CH_2-CH_2-CH_2-OH$ | yellowish red (bright) |
| 60 | '' | $R^1 = -$⌬<br>$R^2 = -CH_2-CH_2-O-CH_2-CH_2-OH$ | '' |
| 61 | '' | $R^1 = -CH_2-CH_2-O-CH_2-CH_2-OH$<br>$R^2 = -$⌬ | '' |
| 62 | '' | $R^1 = -C_6H_5$<br>$R^2 = -C_4H_9(n)$ | '' |
| 63 | '' | $R^1 = -C_2H_5$<br>$R^2 = -C_6H_5$ | '' |
| 64 |  | $R^1 = -$⌬$-OCH_3$<br>$R^2 = -CH_2-CH_2-O-CH_2-CH_2-OH$ | yellowish red |
| 65 | '' | $R^{1,2} = -C_2H_5$ | orange (bright) |
| 66 | '' | $R^{1,2} = -C_3H_7(n)$ | '' |
| 67 | '' | $R^1 = -$⌬$-CH_3$<br>$R^2 = -CH_2-CH_2-CH_2-OH$ | yellowish red |
| 68 | '' | $R^1 = -$⌬$-CH_3$<br>$R^2 = -CH_2-CH_2-CH_2-OH$ | '' |
| 69 | '' | $R^1 = -$⌬$-OCH_3$<br>$R^2 = -CH_2-CH_2-CH_2-OH$ | '' |
| 70 |  | $R^1 = -$⌬$-SO_3Na$<br>$R^2 = -C_3H_7(n)$ | orange |
| 71 |  | $R^1 = -$⌬$-SO_3Na$<br>$R^2 = C_4H_9(n)$ | '' |
| 72 |  | '' | yellowish red |
| 73 |  | $R^1 = -$⌬$-SO_3Na$<br>$R^2 = C_4H_9(n)$ | yellowish red |
| 74 |  | '' | yellow |

-Continued

| No. | Diazo component | Coupling component | Shade |
|---|---|---|---|
| 75 | ![benzene with COOC₄H₉(n) and -NH₂] | '' | '' |
| 76 | ![benzene with CN and -NH₂] | R¹ 32 — ![benzene with SO₃Na and CH₃]<br>R² 32 —C₄H₉(n) | '' |
| 77 | Cl—![benzene with CN and -NH₂] | R¹ = — ![benzene with SO₃Na and OCH₃]<br>R² = C₄H₉(n) | orange |
| 78 | Cl—![benzene with CN and -NH₂] | R¹ = C₂H₅<br>R² = — ![benzene with SO₃Na] | '' |
| 79 | '' | R¹ = — ![benzene with SO₃Na]<br>R² = —CH₂—CH₂—CH₂—OSO₃Na | '' |
| 80 | Br—![benzene with CN, -NH₂, Br] | '' | yellowish red |
| 81 | Cl—![benzene with CN and -NH₂] | R¹,² = —CH₂—CH₂—![benzene-SO₃Na] | yellow |
| 82 | '' | R¹,² = —CH₂—CH— ![benzene-SO₃Na]<br>          CH₃ | '' |
| 83 | '' | R¹,² = —CH₂—CH₂—O— ![benzene-SO₃Na] | '' |
| 84 | ![phthalimide with CH₂—CH₂—OSO₃Na on N and -NH₂] | R¹ = —C₆H₅<br>R² = —CH₂—CH₂—CH₂—OH | '' |
| 85 | ![phthalimide with N-substituted tolyl-SO₃Na (CH₃) and -NH₂] | '' | '' |
| 86 | Cl—![benzene with CN and -NH₂] | R¹,² = —CH₂—CH₂—CH— ![benzene-SO₃Na]<br>                    CH₃ | '' |
| 87 | '' | R¹ = —CH₂—CH₂— ![benzene-SO₃Na]<br>R² = CH₂—CH₂—O—CH₃ | '' |

| No. | Diazo component | Coupling component | Shade |
|---|---|---|---|
| 88 | '' | $R^1 = -CH_2-CH_2-\underset{}{\bigcirc}-SO_3Na$ <br> $R^2 = -C_4H_9(n)$ | '' |
| 89 | '' | $R^1 = -C_2H_5$ <br> $R^2 = -CH_2-CH_2-\underset{}{\bigcirc}-SO_3Na$ | '' |
| 90 | Br—<img>CN, NH_2</img> | $R^{1,2} = -CH_2-CH_2-\underset{}{\bigcirc}-SO_3Na$ | yellow |
| 91 | '' | $R^1 = -CH_2-CH_2-\underset{}{\bigcirc}-SO_3Na$ <br> $R^2 = -C_4H_9(n)$ | '' |
| 92 | Br—<img>CN, NH_2, Br</img> | $R^{1,2} = -CH_2-CH_2-\underset{}{\bigcirc}-SO_3Na$ | orange |
| 93 | '' | $R^1 = -\underset{}{\bigcirc}-SO_3Na$ <br> $R^2 = -C_4H_9(n)$ | yellowish red |
| 94 | <img>CN, NH_2</img> | $R^1 = -CH_2-CH_2-\underset{}{\bigcirc}-SO_3Na$ | yellow |
| 95 | '' | $R^{1,2} = -CH_2-CH_2-\underset{}{\bigcirc}-SO_3Na$ | '' |
| 96 | '' | $R^1 = -CH_2-CH_2-\underset{}{\bigcirc}-SO_3Na$ <br> $R^2 = -CH_2-CH_2-OH$ | '' |
| 97 | '' | $R^1 = -CH_2-CH_2-CH_2-O-SO_3K$ <br> $R^2 = -C_4H_9(n)$ | '' |
| 98 | '' | $R^{1,2} = -CH_2-CH_2-CH_2-O-SO_3K$ | '' |
| 99 | '' | $R^1 = -\underset{}{\bigcirc}-SO_3Na$ <br> $R^2 = -C_4H_9(n)$ | '' |
| 100 | '' | $R^{1,2} = -\underset{}{\bigcirc}-SO_3Na$ | orange |
| 101 | <img>CN, NH_2</img> | $R^1 = -\underset{}{\bigcirc}-SO_3Na$ <br> $R^2 = -CH_2-CH_2-CH_2-OCOCH_3$ | yellow |
| 102 | Cl—<img>CF_3, NH_2</img> | $R^1 = -\underset{}{\bigcirc}-SO_3Na$ | '' |
| 103 | '' | $R^{1,2} = -CH_2-CH_2-\underset{}{\bigcirc}-SO_3Na$ | '' |
| 104 | <img>COOCH_3, NH_2</img> | $R^{1,2} = -CH_2-CH_2-\underset{}{\bigcirc}-SO_3Na$ | '' |
| 105 | '' | $R^1 = -CH_2-CH_2-\underset{}{\bigcirc}-SO_3Na$ <br> $R^2 = -C_4H_9(n)$ | '' |

—Continued

| No. | Diazo component | Coupling component | Shade |
|---|---|---|---|
| 106 | " | $R^1 = -C_2H_5$<br>$R^2 = -CH_2-CH_2-\text{C}_6H_4\text{-SO}_3Na$ | " |
| 107 | " | $R^{1,2} = -CH_2-CH_2-CH_2-O-SO_3Na$ | " |
| 108 | $NaO_3S$-2,5-dichloro-4-aminobenzene (Cl, Cl, NH$_2$) | $R^1 = -\text{C}_6H_4\text{-OH}$<br>$R^2 = -CH_2-CH_2-OH$ | orange |
| 109 | 2-COOCH$_3$-aniline (-NH$_2$) | $R^1 = -\text{C}_6H_4\text{-SO}_3Na$<br>$R^2 = -C_4H_9(n)$ | yellow |
| 110 | " | $R^1 = -C_2H_5$<br>$R^2 = -\text{C}_6H_4\text{-SO}_3Na$ | " |
| 111 | 2-COOCH$_3$-aniline (-NH$_2$) | $R^1 = -\text{C}_6H_4\text{-SO}_3Na$<br>$R^2 = -CH_2-CH_2-CH_2-OCOCH_3$ | yellow |
| 112 | $HO_3S$-2,5-dichloro-4-aminobenzene (Cl, Cl, NH$_2$) | $R^{1,2} = -CH_2-CH_2-OH$ | " |
| 113 | " | $R^{1,2} = -CH_2-CH_2-CH_2-OH$ | " |
| 114 | " | $R^{1,2} = -C_2H_5$ | " |
| 115 | " | $R^1 = -C_2H_5$<br>$R^2 = -CH_2-CH_2-O-CH_2-CH_2-OH$ | " |
| 116 | " | $R^1 = -C_4H_9(n)$<br>$R^2 = -CH_2-CH_2-O-CH_2-CH_2-OH$ | " |
| 117 | " | $R^1 = -CH_2-CH(OH)-CH_3$<br>$R^2 = -CH_2-CH_2-O-CH_2-CH_2-OH$ | " |
| 118 | " | $R^1 = -\text{C}_6H_5$<br>$R^2 = -CH_2-CH_2-OH$ | orange |
| 119 | " | $R^1 = -\text{C}_6H_5$<br>$R^2 = -CH_2-CH_2-CH_2-OH$ | " |
| 120 | " | $R^1 = -\text{C}_6H_5$<br>$R^2 = -CH_2-CH_2-O-CH_2-CH_2-OH$ | " |
| 121 | " | $R^1 = -CH_2-CH_2-\text{C}_6H_4\text{-SO}_3Na$<br>$R^2 = -C_4H_9(n)$ | yellow |
| 122 | $HO_3S$-2,5-dichloro-4-aminobenzene (Cl, Cl, NH$_2$) | $R^1 = -\text{C}_6H_4\text{-SO}_3Na$<br>$R^2 = -C_4H_9(n)$ | orange |
| 123 | " | $R^{1,2} = H$ | yellow |
| 124 | " | $R^1 = -\text{C}_6H_4\text{-OCH}_3$<br>$R^2 = -CH_2-CH_2-CH_2-OH$ | orange |
| 125 | $\text{C}_6H_5\text{-N=N-}\text{C}_6H_4\text{-NH}_2$ | $R^{1,2} = -CH_2-CH_2-\text{C}_6H_4\text{-SO}_3Na$ | yellowish red |
| 126 | " | $R^{1,2} = -CH_2-CH_2-O-\text{C}_6H_4\text{-SO}_3Na$ | " |

| No. | Diazo component | Coupling component | Shade |
|---|---|---|---|
| 127 | " | $R^{1,2} = -CH_2-CH(CH_3)-\text{C}_6\text{H}_4-SO_3Na$ | " |
| 128 | " | $R^1 = -CH_2-CH_2-\text{C}_6\text{H}_4-SO_3Na$; $R^2 = -CH_2-CH_2-O-CH_3$ | " |
| 129 | $\text{C}_6\text{H}_5-N=N-\text{C}_6\text{H}_4-NH_2$ | $R^1 = -CH_2-CH_2-\text{C}_6\text{H}_4-SO_3Na$; $R^2 = -C_4H_9(n)$ | " |
| 130 | " | $R^1 = -\text{C}_6\text{H}_4-SO_3Na$; $R^2 = -C_4H_9(n)$ | " |
| 131 | " | $R^1 = -\text{C}_6\text{H}_4-SO_3Na$; $R^2 = -CH_2-CH_2-CH_2-O-CH_3$ | " |
| 132 | " | $R^1 = -\text{C}_6\text{H}_4-SO_3Na$; $R^2 = -CH_2-CH_2-CH_2-OCOCH_3$ | " |
| 133 | " | $R^1 = -C_2H_5$; $R^2 = -\text{C}_6\text{H}_4-SO_3Na$ | " |
| 134 | $\text{C}_6\text{H}_5-N=N-\text{C}_6\text{H}_4-NH_2$ | $R^1 = -CH_2-CH_2-\text{C}_6\text{H}_4-SO_3K$ | yellowish red |
| 135 | " | $R^1 = -\text{C}_6\text{H}_4-SO_3K$; $R^2 = -CH_2-CH_2-CH_2-O-SO_3K$ | " |
| 136 | isoindolinone with N-CH_2-CH_2-OH and -NH_2 | $R^{1,2} = -CH_2-CH_2-\text{C}_6\text{H}_4-SO_3Na$ | yellow |
| 137 | " | $R^1 = -\text{C}_6\text{H}_4-SO_3Na$; $R^2 = -C_4H_9(n)$ | yellowish orange |
| 138 | dibenzothiophene sulfone-NH_2 | $R^{1,2} = -CH_2-CH_2-\text{C}_6\text{H}_4-SO_3Na$ | ,216 yellow |
| 139 | " | $R^{1,2} = -\text{C}_6\text{H}_4-SO_3Na$ | orange |
| 140 | 2-amino-1,3-bis(COOC_2H_5)benzene | $R^1 = -CH_2-CH_2-\text{C}_6\text{H}_4-SO_3Na$; $R^2 = -C_4H_9(n)$ | reddish yellow |
| 141 | " | $R^1 = -\text{C}_6\text{H}_4-SO_3Na$; $R^2 = -C_4H_9(n)$ | orange |
| 142 | benzene with COOCH_3, COOC_3H_7, NH_2 | $R^1 = -CH_2-CH_2-\text{C}_6\text{H}_4-SO_3Na$; $R^2 = C_4H_9(n)$ | reddish yellow |
| 143 | $\text{C}_6\text{H}_5-NH-CO-\text{C}_6\text{H}_3(SO_3Na)-NH_2$ | $R^1 = -C_2H_5$; $R^2 = -CH_2-CH_2-O-CH_2-CH_2-OH$ | yellow |

-Continued

| No. | Diazo component | Coupling component | Shade |
|---|---|---|---|
| 144 | CH₃—CO—N(H)—⟨C₆H₄⟩—NH₂ | $R^{1,2}$ = —CH₂—CH₂—⟨C₆H₄⟩—SO₃Na | greenish yellow |
| 145 | " | $R^1$ = —⟨C₆H₄⟩—SO₃Na; $R^2$ = —C₄H₉(n) | yellow |
| 146 | " | $R^1$ = —C₂H₅; $R^2$ = —⟨C₆H₄⟩—SO₃Na | " |
| 147 | O₂N—⟨C₆H₄⟩—NH₂ | $R^1$ = —C₂H₅; $R_2$ = —⟨C₆H₄⟩—SO₃Na | yellowish red |
| 148 | " | $R^1$ = —CH₂—CH₂—⟨C₆H₄⟩—SO₃Na; $R^2$ = —C₄H₉(n) | orange |
| 149 | CH₃—NHSO₂—⟨C₆H₄⟩—NH₂ | $R^{1,2}$ = —CH₂—CH₂—⟨C₆H₄⟩—SO₃Na | yellow |
| 150 | " | $R^1$ = —⟨C₆H₄⟩—SO₃Na; $R^2$ = —C₄H₉(n) | yellow |
| 151 | (n)C₄H₉—CH(C₂H₅)—CH₂NHCO—⟨C₆H₄⟩—NH₂ | $R^{1,2}$ = —CH₂—CH₂—⟨C₆H₄⟩—SO₃Na | " |
| 152 | C₄H₉(n)NHSO₂—⟨C₆H₄⟩—NH₂ | " | " |
| 153 | C₄H₉(n)NHCO—⟨C₆H₄⟩—NH₂ | " | " |
| 154 | CH₃CO—NH—⟨C₆H₄⟩—NH₂ | " | greenish yellow |
| 155 | (C₂H₅)₂N—CO—⟨C₆H₄⟩—NH₂ | $R^{1,2}$ = —CH₂—CH₂—⟨C₆H₄⟩—SO₃Na | yellow |
| 156 | C₈H₁₇(i)NH—C(=O)—⟨C₆H₃(Cl)⟩—NH₂ | " | " |
| 157 | ⟨C₆H₄(CH₃)⟩—N=N—⟨C₆H₃(CH₃)⟩—(CH₃)... | $R^{1,2}$ = —CH₂—CH₂—⟨C₆H₄⟩—SO₃Na | yellow red |
| 158 | ⟨C₆H₃(CH₃)⟩—N=N—⟨C₆H₃(CH₃)⟩—NH₂ | " | " |
| 159 | Cl—⟨C₆H₄⟩—N=N—⟨C₆H₃(CH₃)⟩—NH₂ | " | " |
| 160 | ⟨C₆H₅⟩—N=N—⟨C₆H₂(Br)(Br)⟩—NH₂ | " | brownish red |
| 161 | Cl—⟨C₆H₃(SO₃H)⟩—NH₂ | $R^1$ = C₂H₅; $R^2$ = —CH₂—CH₂—O—CH₂—CH₂—OH | yellow |

—Continued—

| No. | Diazo component | Coupling component | Shade |
|---|---|---|---|
| 162 | Cl, Cl substituted benzene with SO$_3$H and NH$_2$ | " | " |
| 163 | NaO$_3$S—C$_6$H$_4$—N=N—C$_6$H$_3$(SO$_3$Na)—NH$_2$ | R$^1$ = —CH$_2$—CH$_2$—C$_6$H$_5$<br>R$^2$ = —CH$_2$—CH$_2$—OH | red |
| 164 | KO$_3$S—C$_6$H$_4$—N=N—C$_6$H$_3$(SO$_3$K)—NH$_2$ | R$^1$ = —C$_6$H$_4$—SO$_3$K<br>R$^2$ = —CH$_2$—CH(C$_2$H$_5$)—C$_4$H$_9$(n) | bluish red |
|  | HO$_3$S—C$_6$H$_4$—N=N—C$_6$H$_3$(SO$_3$H)—NH$_2$ | CH$_3$, CN, C$_2$H$_5$ substituted pyridine with —NHR$_1$ |  |
| 165 | " | R$^1$ = H; NH$_2$ | yellowish red |
| 166 | " | R$^1$ = C$_2$H$_5$ | " |
| 167 | " | R$^1$ = C$_3$H$_7$(n) | red |
| 168 | " | R$^1$ = C$_4$H$_{9(n)}$ | " |
| 169 | " | R$^1$ = C$_4$H$_9$(i) | " |
| 170 | " | R$^1$ = —CH$_2$—CH$_2$—CH$_2$—OH | " |
| 171 | " | R$^1$ = —CH$_2$—CH$_2$—CH$_2$—O—CH$_3$ | " |
| 172 | " | R$^1$ = —CH$_2$—CH$_2$—C$_6$H$_5$ | " |
| 173 | " | R$^1$ = —C$_6$H$_5$ | " |
| 174 | " | R$^1$ = C$_6$H$_{13}$(n) | " |
| 175 | " | R$^1$ = C$_8$H$_{17}$(i) | " |
| 176 | HO$_3$S—C$_6$H$_4$—N=N—C$_6$H$_4$—NH$_2$ | R$^1$ = C$_2$H$_5$ | yellowish red |
| 177 | " | R$^1$ = —C$_2$H$_4$—O—CH$_3$ | " |
| 178 | HO$_3$S—C$_6$H$_4$—N=N—naphthyl(SO$_3$H)—NH$_2$ | R$^1$ = —C$_2$H$_5$ | red |
| 179 | CN, NH$_2$ substituted benzene | R$^1$ = —CH$_2$—CH$_2$—C$_6$H$_4$—SO$_3$Na | yellow |
|  |  | CH$_3$, CONH$_2$ substituted benzene with —NH—C$_2$H$_4$O—SO$_3$H and NHR$_2$ |  |
| 180 | C$_6$H$_5$—N=N—C$_6$H$_4$—NH$_2$ | R$^2$ = —C$_2$H$_5$ | red |
| 181 | " | R$^2$ = —C$_3$H$_7$(n) | " |
| 182 | " | —C$_4$H$_9$(n) | " |
| 183 | " | —C$_6$H$_5$ | bluish red |
| 184 | " | —C$_6$H$_4$—CH$_3$ | " |
| 185 | " | CH$_3$—C$_6$H$_4$— | " |
| 186 | COOCH$_3$, NH$_2$ substituted benzene |  | yellow |
| 187 | " | —C$_2$H$_5$ | " |
| 188 | " | —C$_3$H$_7$ | " |
| 189 | " | —C$_4$H$_9$ | " |
| 190 | CN, NH$_2$ substituted benzene | —C$_6$H$_5$ | " |
| 191 | " | —C$_2$H$_5$ | " |
| 192 | " | —C$_4$H$_9$ | " |
| 193 | Cl, CN, NH$_2$ substituted benzene | —C$_6$H$_5$ | orange |

| No. | Diazo component | Coupling component | Shade |
|---|---|---|---|
| 194 | " | —C$_2$H$_5$ | reddish yellow |
| 195 | " | —C$_3$H$_7$(n) | " |
| 196 | " | —C$_4$H$_9$(n) | " |
| 197 | (2-COOCH$_3$-phenyl)-NH$_2$ | R$^1$ = —C$_2$H$_5$ (pyridine coupler with CH$_3$, CN, NH—R$^1$, NH—C$_2$H$_4$O—SO$_3$Na) | yellow |
| 198 | " | —C$_3$H$_7$(n) | " |
| 199 | " | —C$_4$H$_9$(n) | " |
| 200 | " | —C$_6$H$_5$ | " |
| 201 | " | —C$_6$H$_4$—CH$_3$ | " |
| 202 | " | —C$_6$H$_4$—CH$_3$ | " |
| 203 | (2-CN-phenyl)-NH$_2$ | R$^1$ = —C$_2$H$_5$ | " |
| 204 | " | —C$_3$H$_7$(n) | " |
| 205 | " | —C$_4$H$_9$(n) | " |
| 206 | " | —C$_6$H$_5$ | reddish yellow |
| 207 | " | —C$_6$H$_4$—CH$_3$ | " |
| 208 | Cl—(CN-phenyl)-NH$_2$ | R$^1$ = —C$_2$H$_5$ | " |
| 209 | " | —C$_4$H$_9$(n) | " |
| 210 | Cl—(CN-phenyl)-NH$_2$ | —C$_6$H$_5$ | reddish yellow |
| 211 | HO$_3$S—C$_6$H$_4$—N=N—C$_6$H$_4$—NH$_2$ | —C$_2$H$_5$ | yellowish red |
| 212 | " | —C$_6$H$_5$ | " |
| 213 | HO$_3$S—C$_6$H$_4$—N=N—(SO$_3$H-phenyl)-NH$_2$ | —C$_6$H$_5$ | bluish red |
| 214 | " | —C$_6$H$_4$—CH$_3$ (pyridine coupler with H$_3$C, CONH$_2$, NH—R$_1$, NH—C$_2$H$_4$O—SO$_3$H) | " |
| 215 | C$_6$H$_5$—N=N—C$_6$H$_4$—NH$_2$ | R$^1$ = —C$_2$H$_5$ | red |
| 216 | " | R$^1$ = —C$_3$H$_7$(n) | " |
| 217 | " | —C$_4$H$_9$(n) | " |
| 218 | " | —CH$_2$—CH$_2$—O—CH$_3$ | " |
| 219 | " | —C$_6$H$_5$ | bluish red |
| 220 | " | —C$_6$H$_4$—CH$_3$ | " |
| 221 | " | —C$_6$H$_4$—CH$_3$ | " |
| 222 | " | —C$_6$H$_4$—CH$_3$ | " |

| No. | Diazo component | Coupling component | Shade |
|---|---|---|---|
| 223 | HO₃S—⟨⟩—N=N—⟨⟩—NH₂ | R¹ = —C₂H₅ | bluish red |
| 224 | " | —C₄H₉(n) | " |
| 225 | " | —⟨⟩ | " |
| 226 | HO₃S—⟨⟩—N=N—⟨⟩(SO₃H)—NH₂ | R¹ = —C₈H₁₇(i) | " |
| 227 | " | —C₄H₉(n) | " |
| 228 | " | —⟨⟩ | " |
| 229 | " | —⟨⟩—CH₃ | " |
|  |  | H₃C, CONH₂ on pyridine with —NH—R₁ and NH—R₂ |  |
| 230 | NaO₃S—⟨⟩—N=N—⟨⟩(SO₃Na)—NH₂ | R¹,² = —C₂H₅ | " |
| 231 | " | R¹,² = —C₄H₉(n) | violet |
| 232 | Cl—⟨⟩(CN)—NH₂? see note | R¹,² = —CH₂—CH₂—CH₂—O—CH₃ | " |
|  |  | R² = —CH₂—CH₂—O—CH₃ |  |
| 234 | Cl—⟨⟩—NH₂ | R¹ = —⟨⟩SO₃Na | orange |
|  |  | R² = —CH₂—CH₂—CH₂—O—CH₃ |  |
| 235 | " | R¹ = —⟨⟩SO₃Na | " |
|  |  | R² = —C₂H₅ |  |
| 236 | ⟨⟩(COOCH₃)—NH₂ | R¹ = —⟨⟩SO₃Na | orange |
|  |  | R² = —C₂H₅ |  |
| 237 | ⟨⟩(CN)—NH₂ |  | " |

EXAMPLE 238

Fifty parts of the dye of the formula:

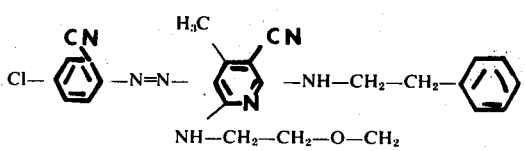

is added in portions to 160 parts of 20% oleum at room temperature with efficient stirring. The mixture is then stirred for another 3 to 5 hours at 30° to 40°C and after sulfonation is completed the whole is allowed to flow with efficient stirring onto a mixture of about 1000 parts of ice, 500 parts of water and 300 parts of 50% caustic soda solution. Then 50 parts of sodium chloride is added, the whole is stirred for two hours at about 10°C, and the precipitated dye of the formula:

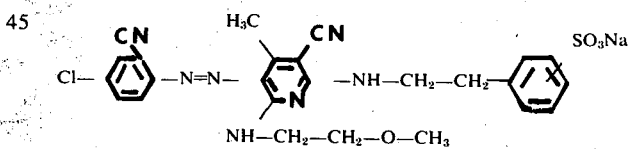

is filtered off and washed with an aqueous solution of common salt. After drying about 50 parts of an orange red powder is obtained which dissolves in water with a yellow color and dyes polycaprolactam cloth yellow shades of very good fastness properties.

EXAMPLE 239

19.7 parts of 4-aminoazobenzene is stirred overnight with about 30 parts of 30% hydrochloric acid. About 150 parts of water is then added, the whole is cooled to 10°C, 32.5 parts by volume of 23% sodium nitrite solution is allowed to flow in and the whole is stirred for about 3 hours at 10° to 15°C. Any 4-aminoazobenzene which has not been diazotized is filtered off, any excess of nitrous acid present is destroyed as usual and the diazonium salt solution is allowed to flow into a solution, cooled to 5°C, of 56 parts of the coupling component of the formula:

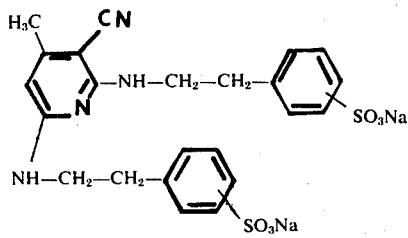

in about 300 parts of the water and 10 parts of 30% hydrochloric acid. Triethylamine is then added until the pH of the coupling mixture is from about 3 to 4. After coupling is complete the precipitated dye of the formula:

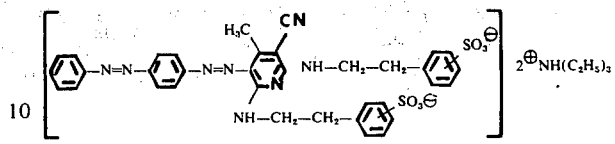

is filtered off and dried. A red powder is obtained which dyes polycaprolactam cloth yellowish red shades having excellent fastness properties.

The following dyes may also be prepared by the methods described:

| No. | Dye | Shade on polycaprolactam or wool |
|-----|-----|----------------------------------|
| 240 | | reddish brown |
| 241 | | yellow |
| 242 | | orange |
| 243 | | red |
| 244 | | orange |

-Continued

| No. | Dye | Shade on polycaprolactam or wool |
|---|---|---|
| 245 | 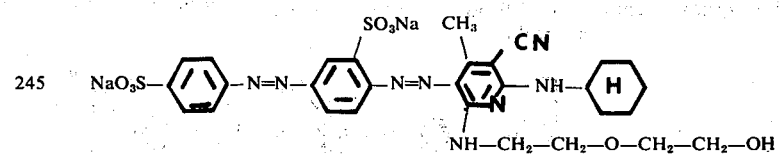 | red |
| 246 | 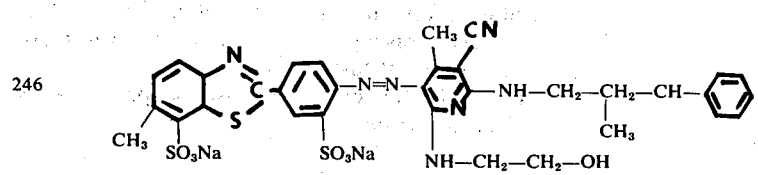 | orange |
| 247 | 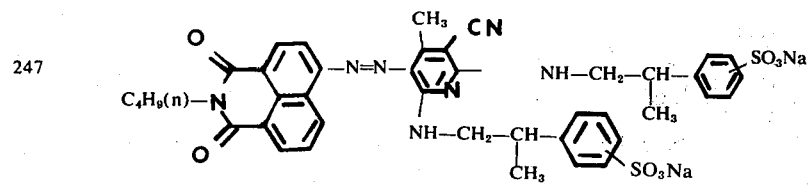 | red |

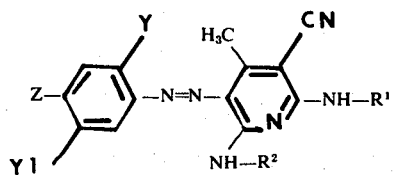

Shade = Shade of dyeing on polycaprolactam

| No. | Z | Y | Y¹ | R¹ | R² | Shade |
|---|---|---|---|---|---|---|
| 248 | H | SO₃Na | NH—COCH₃ | H | CH₂CH₂OH | yellow |
| 249 | '' | '' | '' | CH₂CH₂OH | '' | '' |
| 250 | '' | '' | '' | H | (CH₂)₃OH | '' |
| 251 | '' | '' | '' | (CH₂)₃OH | '' | '' |
| 252 | '' | '' | '' | (CH₂CH₂O)₂H | (CH₂CH₂O)₂H | '' |
| 253 | '' | '' | '' | H | '' | '' |
| 254 | '' | '' | '' | CH₂CH₂OH | (CH₂)₃OH | '' |
| 255 | '' | '' | '' | '' | (CH₂CH₂O)₂H | '' |
| 256 | SO₃Na | H | '' | '' | CH₂CH₂OH | '' |
| 257 | '' | '' | '' | (CH₂)₃OH | (CH₂)₃OH | '' |
| 258 | CH₃O—⟨phenyl⟩—N=N— | '' | SO₃Na | CH₂CH₂OH | CH₂CH₂OH | red |
| 259 | '' | SO₃Na | H | '' | '' | '' |
| 260 | '' | '' | '' | (CH₂)₃OH | (CH₂)₃OH | '' |
| 261 | '' | H | SO₃Na | '' | '' | '' |
| 262 | '' | '' | '' | H | '' | yellowish red |
| 263 | '' | SO₃Na | H | '' | '' | '' |
| 264 | '' | '' | '' | '' | CH₂CH₂OH | '' |
| 265 | '' | H | SO₃Na | '' | '' | '' |
| 266 | NaO₃S—⟨phenyl(SO₃Na)⟩—N=N— | CH₃ | CH₃ | (CH₂)₃OH | (CH₂)₃OH | red |
| 267 | (SO₃Na)₂-phenyl—N=N— | '' | '' | CH₂CH₂OH | CH₂CH₂OH | '' |

-Continued
Shade = Shade of dyeing on polycaprolactam

| No. | Z | Y | Y¹ | R¹ | R² | Shade |
|---|---|---|---|---|---|---|
| 268 | '' | '' | '' | (CH₂)₃OH | (CH₂)₃OH | '' |
| 269 | '' | '' | '' | H | '' | '' |
| 270 | '' | '' | '' | '' | (CH₂CH₂O)₂H | '' |
| 271 | '' | '' | '' | '' | CH₂CH₂OH | '' |
| 272 | '' | '' | '' | C₂H₅ | C₂H₅ | '' |
| 273 | '' | '' | '' | '' | CH₂CH₂OH | '' |
| 274 | '' | '' | '' | C₄H₉(n) | (CH₂CH₂O)₂H | '' |
| 275 | '' | '' | '' | CH₂CH₂CH₂OCH₃ | (CH₂)₃OH | '' |
| 276 | '' | '' | OCH₃ | '' | C₂H₅ | C₂H₅ | '' |
| 277 | ![SO₃Na-phenyl(SO₃Na)-N=N-] | CH₃ | '' | (CH₂)₃OH | (CH₂)₃OH | '' |
| 278 | '' | '' | '' | C₂H₅ | CH₂CH₂OH | '' |
| 279 | NaO₃S—⟨phenyl⟩—N=N— | '' | '' | CH₂CH₂OH | '' | '' |
| 280 | '' | '' | '' | (CH₂)₃OH | (CH₂)₃OH | '' |
| 281 | '' | '' | '' | CH₂CH₂OH | '' | '' |
| 282 | ![SO₃Na-phenyl-N=N-] | '' | '' | '' | CH₂CH₂OH | '' |
| 283 | '' | '' | '' | '' | CH₂CH₂OH | '' |
| 284 | '' | '' | '' | (CH₂)₃OCH₃ | '' | '' |
| 285 | '' | '' | '' | (CH₂)₂OCH₃ | '' | yellowish red |
| 286 | '' | '' | '' | '' | (CH₂CH₂O)₂H | '' |
| 287 | NaO₃S—⟨phenyl⟩—N=N— | SO₃Na | H | —⟨cyclohexyl⟩ | CH₂CH₂OH | red |
| 288 | '' | '' | '' | (CH₂)₆—N(pyrrolidinone) | '' | '' |
| 289 | '' | '' | '' | (CH₂)₂—N(pyrrolidinone) | '' | '' |
| 290 | '' | '' | '' | '' | '' | '' |
| 291 | '' | '' | '' | CH₂CHC₆H₅ / OH | '' | '' |
| 292 | '' | '' | '' | '' | '' | '' |
| 293 | '' | '' | '' | —⟨cyclohexyl⟩ | '' | '' |
| 294 | '' | '' | '' | (CH₂)₆CN | '' | '' |
| 295 | ![H₃C-benzothiazole-SO₃Na] | '' | '' | CH₂CHC₆H₅ / OH | '' | orange |
| 296 | ![H₃C-benzothiazole-SO₃Na] | '' | '' | CH(CH₂)₂—⟨phenyl⟩—OH / CH₃ | (CH₂CH₂O)₂H | '' |
| 297 | '' | '' | '' | CH(CH₂)₃C(CH₃)₂ / CH₃  OH | '' | '' |
| 298 | NaO₃S—⟨phenyl⟩—N=N— | '' | '' | '' | '' | red |
| 299 | '' | CH₃ | CH₃ | '' | '' | '' |
| 300 | ![SO₃Na-phenyl-N=N-] | '' | '' | '' | '' | '' |
| 301 | '' | '' | '' | (CH₂)₃O(CH₂)₄OH | CH₂CH₂OH | '' |
| 302 | NaO₃SOCH₂CH₂NHS(=O)(=O)— | Cl | C₆H₅ | CH₂CH₂OH | '' | yellow |
| 303 | '' | '' | '' | C₂H₅ | '' | '' |
| 304 | '' | '' | '' | H | '' | '' |
| 305 | '' | '' | '' | (CH₂)₃OH | (CH₂)₃OH | '' |
| 306 | '' | '' | '' | CH₂CH₂OH | '' | '' |
| 307 | '' | '' | '' | '' | CH₂CH₂OH | '' |
| 308 | '' | '' | '' | (CH₂)₃O(CH₂)₄OH | '' | '' |

3,907,769

Shade = Shade of dyeing on polycaprolactam

| No. | Z | Y | Y¹ | R¹ | R² | Shade |
|---|---|---|---|---|---|---|
| 309 | " | " | " | H | (CH₂)₃O(CH₂)₄OH | " |
| 310 | HO—⟨⟩—N=N— | SO₃Na | " | CH₂CH₂OH | CH₂CH₂OH | yellowish red |
| 311 | " | H | SO₃Na | " | " | " |
| 312 | NaO₃S—⟨⟩(Cl,Cl)—N=N— | CH₃ | CH₃ | " | " | red |
| 313 | NaOSO₃CH₂CH₂O—⟨⟩—N=N— | " | " | " | " | " |
| 314 | CH₃O—⟨⟩(CH₃)—N=N— | SO₃Na | H | " | " | " |

| No. | Dye | Shade |
|---|---|---|
| 315 | NaO₃S—⟨Cl,Cl⟩—N=N—⟨naphthyl-SO₃Na⟩—N=N—⟨pyridine: H₃C, CN, NH—CH₂CH₂OH, NH—CH₂—CH₂OH⟩ | reddish blue |
| 316 | NaO₃S—⟨Cl,Cl⟩—N=N—⟨naphthyl-SO₃Na⟩—N=N—⟨pyridine: H₃C, CN, NH—CH₂CH₂CH₂OH, NH—CH₂CH₂CH₂OH⟩ | blue |
| 317 | NaO₃S—⟨⟩—N=N—⟨⟩(SO₃Na)—N=N—⟨⟩(CH₃,CH₃)—N=N—⟨pyridine: H₃C, CN, NH—CH₂CH₂OH, NH—CH₂CH₂OH⟩ | bluish red |
| 318 | ⟨⟩—SO₂—⟨⟩—N=N—⟨pyridine: H₃C, CONH₂, NH—CH₂—CH₂—⟨⟩—SO₃Na, NH—CH₂—CH₂—⟨⟩—SO₃Na⟩ | yellowish red |

| No. | Z | Y | Y¹ | R¹ | R² | Shade |
|---|---|---|---|---|---|---|
| 319 | 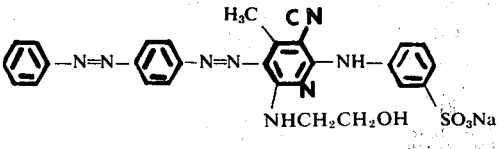 | | | | | red |

-Continued

| No. | Z | Y | Y¹ | R¹ | R² | Shade |
|---|---|---|---|---|---|---|
| 320 | phenyl–N=N– | phenyl–N=N– | pyridine with H₃C, CN, NH–CH₂CH₂OSO₃Na | –NH–CH₂–CH₂–C₆H₄–SO₃Na | | yellowish red |
| 321 | phenyl–SO₂–phenyl–N=N– | | pyridine with CN, NH–CH₂–CH₂–C₆H₄–SO₃Na | –NH–CH₂–CH₂–C₆H₄–SO₃Na | | '' |
| 322 | SO₃Na–C₆H₄–N=N– | 2,6-dimethylphenyl–N=N– | pyridine with CN, NH–CH₂CH₂OH | –NH–CH₂CH₂OH | | red |
| 323 | NaO₃S–C₆H₄–N=N– | Cl,CH₃,CH₃-phenyl–N=N– | pyridine with CN, NH–CH₂CH₂OH | –NH–CH₂CH₂OH | | '' |
| 324 | NaO₃S–(Cl,Cl-phenyl)–N=N– | | pyridine with CN, NHCH₂CH₂CH₂OH | –NH–CH₂CH₂CH₂OH | | yellow |
| 325 | NaO₃S–C₆H₄–N=N– | SO₃Na,CH₃-phenyl–N=N– | pyridine with CN, NH–CH₂CH₂OH | –N(C₂H₅)₂ | | red |

| No. | Dye | Shade |
|---|---|---|
| 326 | benzothiazole (with H₃C, SO₃Na) –phenyl(SO₃Na)–N=N–pyridine(H₃C, CN, NH–CH₂CH₂OH)–N(C₂H₅)₂ | orange |
| 327 | NaO₃S–(2,5-dichlorophenyl)–N=N–pyridine(H₃C, CN, NH–CH₂–CH₂–OH)–N(C₂H₅)₂ | yellow |
| 328 | NaO₃S–(2,5-dichlorophenyl)–N=N–pyridine(H₃C, CN, N(C₂H₅)₂)–N(C₂H₄OH)(C₂H₄OH) | '' |

| No. | Dye | Shade |
|---|---|---|
| 329 | NaO₃S—⟨⟩—N=N—⟨H₃C,CH₃⟩—N=N—⟨H₃C,CN,HNC₂H₄OH⟩—N(C₂H₄OH)₂ | red |
| 330 | ⟨COOCH,⟩—N=N—⟨CH,CONH₂,HN—CH₂CH₂OH⟩—NH—⟨SO₃Na⟩ | reddish orange |
| 331 | NaO₃S—⟨⟩—N=N—⟨CH₃,CH₃⟩—N=N—⟨CH₃,CONH₂,NH—CH₂CH₂OH⟩—NH—⟨SO₃Na⟩ | bluish red |
| 332 | Cl—⟨Cl,Cl⟩—N=N—⟨H₃C,CN,NH—C₂H₅⟩—NH—CH₂—CH₂—⟨SO₃Na⟩ | yellow |
| 333 | NaO₃S—⟨Cl,Cl⟩—N=H—⟨H₅C₆,NH—CH₂CH₂OH⟩—NH—CH₂CH₂OH | yellow |

We claim:
1. A water-soluble acid dye which in the form of the free acid has the formula

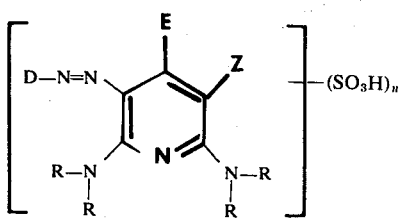

in which:

D is phenyl substituted by fluoro, chloro, bromo, methyl, ethyl, trifluoromethyl, methoxy, ethoxy, alkanoylamino, said alkanoyl having 1 to 4 carbon atoms, hydroxyacetylamino, benzoylamino, chlorobenzoylamino, phenacetylamino, cyano, nitro, methylsulfonyl, ethylsulfonyl, phenylsulfonyl, acetyl, benzoyl, carboxyl, alkoxycarbonyl or alkoxyethoxycarbonyl, said alkoxy having 1 to 4 carbon atoms, carbamoyl, sulfamoyl, carbamoyl or sulfamoyl substituted at the nitrogen once or twice by alkyl of 1 to 8 carbon atoms, phenyl, β-hydroxyethyl, γ-hydroxypropyl, β-methoxyethyl or γ-methoxypropyl; carbopyrrolidide, carbopiperidide, carbomorpholide, sulfopyrrolidide, sulfopiperidide, sulfomorpholide,

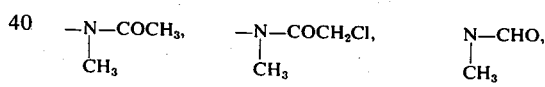

hydroxylsulfonyl, SO₂NHC₂H₄SO₃H or 6-methyl-7-sulfo-2-benzthiazolyl; phenylazophenyl; phenylazophenyl substituted by hydroxy, methyl, methoxy, ethoxy, hydroxysulfonyl or SO₂NHC₂H₄SO₃H; 3- or 4-phthalimidyl; or 3- or 4-phthalimidyl substituted at the nitrogen by alkyl of 1 to 8 carbon atoms, β-hydroxyethyl, β-methoxyethyl, γ-hydroxypropyl, γ-methoxypropyl, β-hydroxyethoxyethyl, benzyl, phenylethyl, sulfobenzyl, sulfophenylethyl, phenyl or phenyl substituted by methyl or hydroxysulfonyl;

n is one of the integers 1, 2 and 3;

E is hydrogen, alkyl of 1 to 7 carbon atoms, phenyl or methylphenyl,

Z is cyano or carbamoyl,

R is hydrogen; alkyl of 1 to 8 carbon atoms; alkyl of 2 to 8 carbon atoms substituted by hydroxy, alkoxy of 1 to 4 carbon atoms, cyclohexoxy, benzyloxy, phenoxy or cyano; cyclohexyl; methylcyclohexyl; norbornyl, benzyl; sulfobenzyl; phenylethyl; sulfophenylethyl; phenylpropyl; sulfophenylpropyl; phenyl, phenyl substituted by methyl, methoxy, ethoxy, chloro or hydroxysulfonyl; sulfoethyl; C₂H₄OC₂H₄OH; (CH₂)₃OC₂H₄OR¹; (CH₂)₃O(CH₂)₄OH;

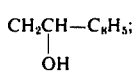 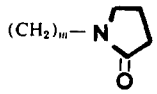

m is 2, 3, 4 or 6,

R when taken in pairs together with the attached nitrogen to form a heterocyclic ring represents pyrrolidino, piperidino or morpholino; and $R^1$ is alkyl of 1 to 4 carbon atoms, benzyl or phenyl, with the proviso that n $SO_3H$-groups are present only in the radicals D and R and n represents the total number of said $SO_3H$-groups in the compound.

2. A dye as claimed in claim 1 of the formula:

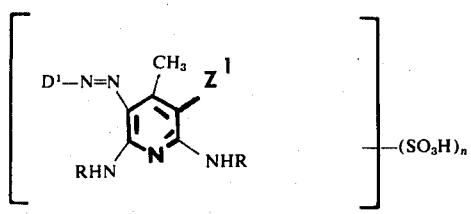

in which $D^1$ is a radical of the formula:

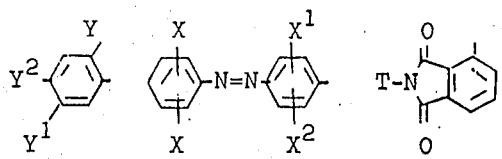

$Z^1$ is cyano or carbamoyl;

Y is hydrogen, cyano, chloro, bromo, methylsulfonyl, ethylsulfonyl, phenylsulfonyl, carbalkoxy or $SO_3H$;

$Y^1$ is hydrogen, chloro, bromo or $SO_3H$;

$Y^2$ is hydrogen, chloro, bromo, methyl, carbalkoxy, 6-methyl-7-sulfo-2-benzthiazolyl or $SO_3H$ X is hydrogen, methyl, methoxy or $SO_3H$;

$X^1$ is hydrogen, methyl, ethoxy or $SO_3H$;

$X^2$ is hydrogen, methyl or methoxy;

T is hydrogen, γ-hydroxypropyl, benzyl, phenylethyl, sulfobenzyl, sulfophenylethyl, phenyl, sulfophenyl, tolyl or sulfotolyl; and R and n have the meanings given in claim 1.

3. A dye as claimed in claim 1 of the formula

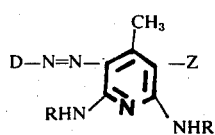

where

R is alkyl of 1 to 8 carbon atoms, alkyl of 2 to 8 carbon atoms substituted by hydroxy, phenoxy, benzyloxy or hydroxysulfonyl, $CH_2CH_2OCH_2CH_2OH$, $(CH_2)_3OC_2H_4OH$, benzyl, phenylethyl, sulfobenzyl, sulfophenylethyl, phenyl, sulfophenyl or hydrogen and D, Z and n have the meanings given in claim 1.

4. A dye as claimed in claim 1 of the formula:

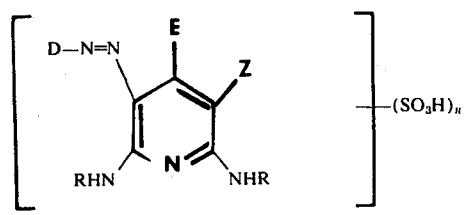

in which

D, E, R, n and Z have the meanings given in claim 1.

5. A dye as claimed in claim 1 where Z is cyano.

6. The dye of the formula

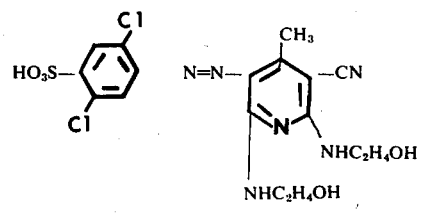

7. The dye of the formula

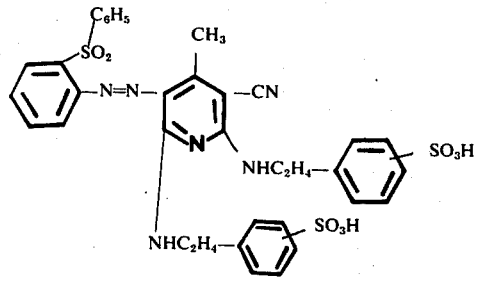

8. The dye of the formula

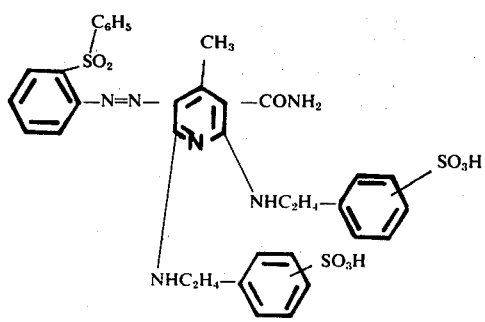

* * * * *

UNITED STATES PATENT AND TRADEMARK OFFICE
CERTIFICATE OF CORRECTION

PATENT NO. : 3,907,769
DATED : September 23, 1975
INVENTOR(S) : Johannes Dehnert et al.

It is certified that error appears in the above-identified patent and that said Letters Patent are hereby corrected as shown below:

In Column 2, Line 5, delete "... ethyl trifluoromethyl ..." and substitute --... ethyl, trifluoromethyl ...--

In Column 3, Line 9, delete " $(CH_2)_3)OC_3H_7$, " and substitute -- $(CH_2)_3OC_3H_7$, --

In Column 6, Line 27, delete " 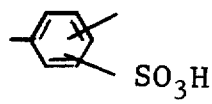 " and substitute -- 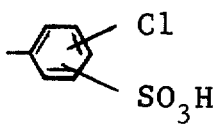 --

In Columns 7 and 8, the third line of formulae at the bottom, delete

" 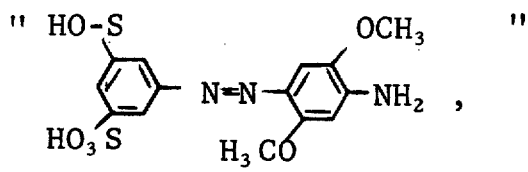 "

and substitute

-- 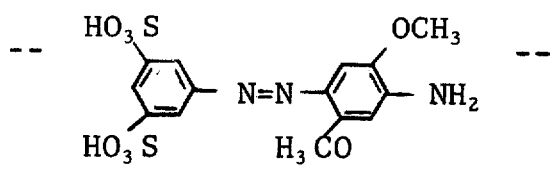 --

UNITED STATES PATENT AND TRADEMARK OFFICE
CERTIFICATE OF CORRECTION

PATENT NO. : 3,907,769
DATED : September 23, 1975
INVENTOR(S) : Johannes Dehnert et al.

It is certified that error appears in the above-identified patent and that said Letters Patent are hereby corrected as shown below:

In Columns 9 and 10, the 8th line of formulae, delete "  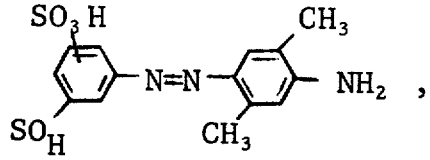  ", and substitute --  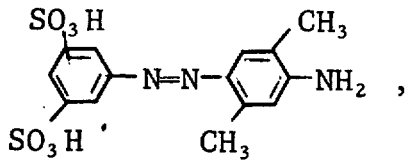  --

In Column 11, Line 59, delete "... n have the means ..." and substitute --... n have the meanings ...--

In Columns 13 and 14, the 2nd line of formula from the bottom, delete

"  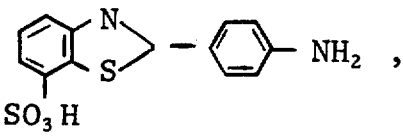  "

and substitute

--  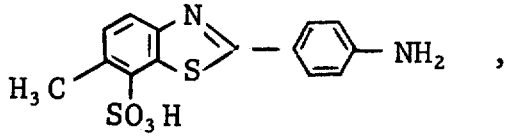  --

UNITED STATES PATENT AND TRADEMARK OFFICE
CERTIFICATE OF CORRECTION

PATENT NO. : 3,907,769
DATED : September 23, 1975
INVENTOR(S) : Johannes Dehnert et al.

It is certified that error appears in the above-identified patent and that said Letters Patent are hereby corrected as shown below:

In Columns 13 and 14, the 2nd line of formulae from the bottom, delete

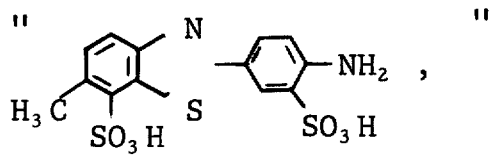

and substitute

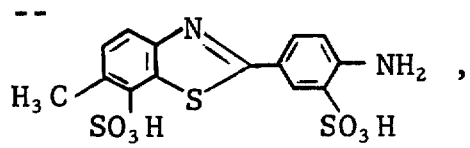

In Columns 15 and 16, insert -- Examples of Preferred Coupling Components Are: -- at the top of the column above the formulae.

In Columns 15 and 16, the formulae at the bottom, delete

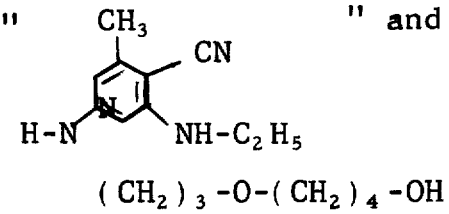    " and substitute --   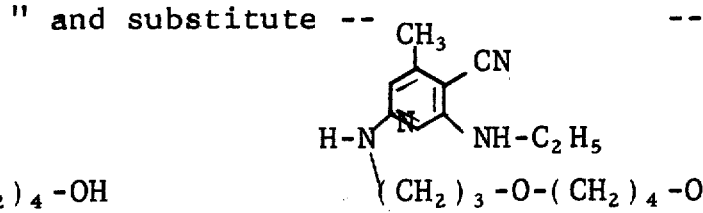   --

UNITED STATES PATENT AND TRADEMARK OFFICE
CERTIFICATE OF CORRECTION

PATENT NO. : 3,907,769
DATED : September 23, 1975
INVENTOR(S) : Johannes Dehnert et al.

It is certified that error appears in the above-identified patent and that said Letters Patent are hereby corrected as shown below:

In Columns 21 and 22, the formula for the diazo component at the top of the column, delete ""

and substitute

-- 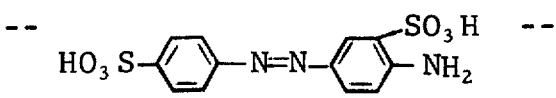 --

In Columns 21 and 22, the formula for the coupling component at the top of the column, delete " 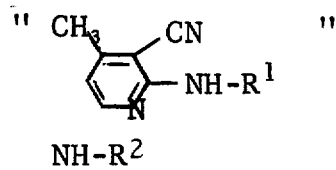 "

and substitute

-- 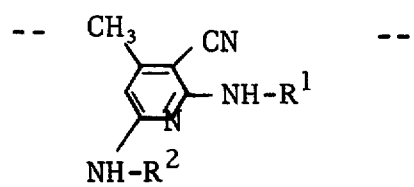 --

In Column 21 and 22, the formula for "$R^2$" in Example 12, delete "... $-CH_2-Ch_2-OH$ " and substitute --... $-CH_2-CH_2-OH$ --

In Column 21 and 22, the formula for "$R^2$" in Example 16, delete "... $-CH_2-Ch_2-OH$ " and substitute --... $-CH_2-CH_2-OH$ --

UNITED STATES PATENT AND TRADEMARK OFFICE
CERTIFICATE OF CORRECTION

PATENT NO. : 3,907,769
DATED : September 23, 1975
INVENTOR(S) : Johannes Dehnert et al.

It is certified that error appears in the above-identified patent and that said Letters Patent are hereby corrected as shown below:

In Columns 21 and 22, the formula for "$R^2$" in Example 17, delete "... $-CH_2-Ch_2-CH_2-OH$ " and substitute -- ... $-CH_2-CH_2-CH_2-OH$ --

In Column 25, the formula under the heading "Dye" for Example 48, delete "

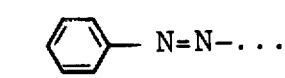

" and substitute

--

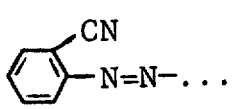

--

In Columns 27 and 28, the formula for "$R^1$" in Example 57, delete "$R^1 32\ C_4H_9(n)$" and substitute -- $R^1 = C_4H_9(n)$ --

In Columns 27 and 28, the formula for "$R^2$" in Example 70, delete "$R^2 32-C_3H_7(n)$" and substitute -- $R^2 = -C_3H_7(n)$ --

In Columns 29 and 30, the formula for "$R^1$" in Example 76, delete "

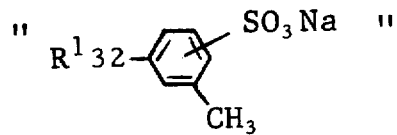

" and substitute --

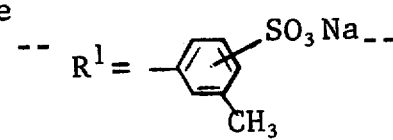

--

UNITED STATES PATENT AND TRADEMARK OFFICE
CERTIFICATE OF CORRECTION

PATENT NO. : 3,907,769
DATED : September 23, 1975
INVENTOR(S) : Johannes Dehnert et al.

It is certified that error appears in the above-identified patent and that said Letters Patent are hereby corrected as shown below:

In Columns 29 and 30, the formula for "$R^2$" in Example 76, delete "$R^232-C_4H_9(n)$" and substitute --$R^2= -C_4H_9(n)$--

In Columns 33 and 34, the formula for "$R^2$" in Example 110, delete amd substitute " 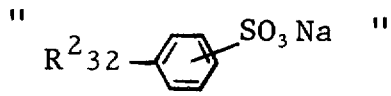 "   --  --

In Columns 35 and 36, the formula for "$R^2$" in Example 128, delete "$R^232-CH_2-CH_2-O-CH_3$" and substitute
--$R^2= -CH_2-CH_2-O-CH_3$ --

In Columns 35 and 36, under the heading "Shade" for Example 138, delete ",216"

In Columns 35 and 36, the formula for "$R^2$" in Example 129, delete "$R^232-CH_4H_9(n)$" and substitute --$R^2= -CH_4H_9(n)$--

In Columns 39 and 40, the formula for "$R^2$" in Example 164, delete "$R^2 = -CH_2-CH-C_4H_9(n)$" and substitute

--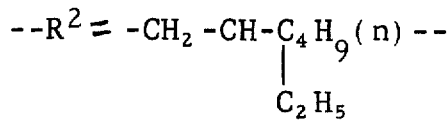--

UNITED STATES PATENT AND TRADEMARK OFFICE
CERTIFICATE OF CORRECTION

PATENT NO. : 3,907,769
DATED : September 23, 1976
INVENTOR(S) : Johannes Dehnert et al.

It is certified that error appears in the above-identified patent and that said Letters Patent are hereby corrected as shown below:

In Columns 39 and 40, under the heading "Shade" for Example 185, insert --red--

In Columns 39 and 40, under the heading "Coupling Component" for Example 186, insert -- 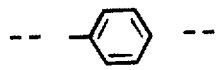 --

In Columns 55 and 56, the formula under the heading "Dye" for Example 330, delete " 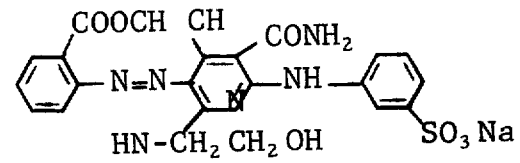 "

and substitute

-- 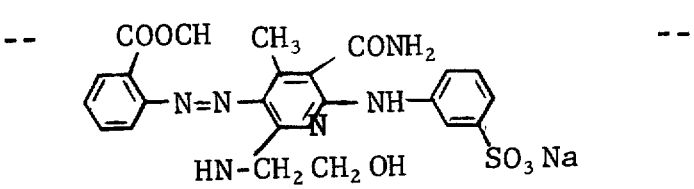 --

In Columns 58, the formula for Claim 6, delete " " and substitute -- --

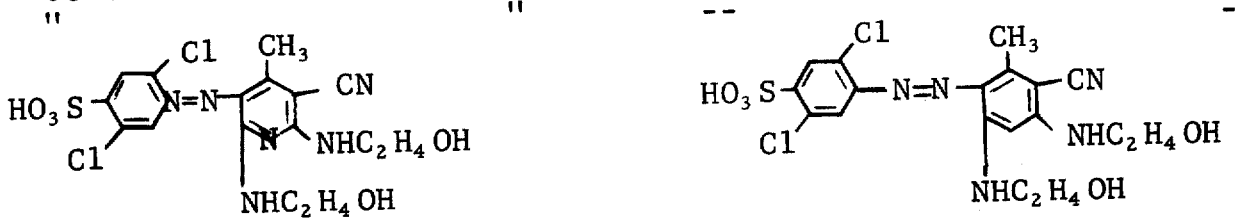

Signed and Sealed this

Twenty-first Day of December 1976

[SEAL]

Attest:

RUTH C. MASON
Attesting Officer

C. MARSHALL DANN
Commissioner of Patents and Trademarks